(12) United States Patent
Callant et al.

(10) Patent No.: US 9,604,490 B2
(45) Date of Patent: Mar. 28, 2017

(54) COLOR LASER MARKING

(71) Applicant: AGFA-GEVAERT, Mortsel (BE)

(72) Inventors: Paul Callant, Mortsel (BE); Bart Waumans, Mortsel (BE); Ingrid Geuens, Mortsel (BE); Bart Aerts, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 0 days.

(21) Appl. No.: 14/433,085

(22) PCT Filed: Oct. 10, 2013

(86) PCT No.: PCT/EP2013/071170
§ 371 (c)(1),
(2) Date: Apr. 2, 2015

(87) PCT Pub. No.: WO2014/057039
PCT Pub. Date: Apr. 17, 2014

(65) Prior Publication Data
US 2015/0251481 A1 Sep. 10, 2015

Related U.S. Application Data

(60) Provisional application No. 61/719,513, filed on Oct. 29, 2012.

(30) Foreign Application Priority Data

Oct. 11, 2012 (EP) .................................. 12188143

(51) Int. Cl.
*B42D 25/382* (2014.01)
*B42D 25/405* (2014.01)
(Continued)

(52) U.S. Cl.
CPC ............ *B42D 25/382* (2014.10); *B32B 27/08* (2013.01); *B32B 27/36* (2013.01); *B41M 5/323* (2013.01);
(Continued)

(58) Field of Classification Search
None
See application file for complete search history.

(56) References Cited

U.S. PATENT DOCUMENTS 3,250,776 A * 5/1966 Friedlander .......... C07D 471/10
504/243
4,049,698 A * 9/1977 Hawkins .............. C07D 239/70
544/231
(Continued)

FOREIGN PATENT DOCUMENTS

EP 0 174 054 A2 3/1986
EP 1 093 015 A1 4/2001
(Continued)

OTHER PUBLICATIONS

Hamer, "The cyanine dyes and related compounds", (1964) pp. 350-355.*
(Continued)

*Primary Examiner* — Martin Angebranndt
(74) *Attorney, Agent, or Firm* — Keating and Bennett, LLP

(57) ABSTRACT

A method for preparing a color laser marked article using three infrared lasers L-1, L-2 and L-3 having respectively a laser emission wavelength of $\lambda(L-1)$, $\lambda(L-2)$ and $\lambda(L-3)$ includes the steps of laser marking with the infrared laser L-1 a first color laser markable layer including an infrared dye IR-1 having an absorption maximum in the infrared region $\lambda_{max}$(IR-1); laser marking with the infrared laser L-2 a second color laser markable layer including an infrared (Continued)

dye IR-2 having an absorption maximum in the infrared region $\lambda_{max}$(IR-2); laser marking with the infrared laser L-3 a third color laser markable layer including an infrared dye IR-3 having an absorption maximum in the infrared region $\lambda_{max}$(IR-3); and at least partially exposing the color laser markable article to light having a wavelength between 520 nm and 700 nm, wherein, the laser emission wavelengths satisfy the condition of: $\lambda$(L-1)>$\lambda$(L-2)>$\lambda$(L-3); the infrared red dye absorption maxima satisfy the condition of: $\lambda_{max}$(IR-1)>$\lambda_{max}$(IR-2)>$\lambda_{max}$(IR-3); and the light emitted by the infrared laser L-1 passes, in order, through the third and second color laser markable layer before exposing the first color laser markable layer.

13 Claims, 2 Drawing Sheets

(51) Int. Cl.
| | | |
|---|---|---|
| B32B 27/16 | (2006.01) | |
| B41M 5/34 | (2006.01) | |
| B41M 5/30 | (2006.01) | |
| B41M 5/323 | (2006.01) | |
| B42D 25/30 | (2014.01) | |
| B32B 27/08 | (2006.01) | |
| B32B 27/36 | (2006.01) | |

(52) U.S. Cl.
CPC ............... *B41M 5/34* (2013.01); *B42D 25/30* (2014.10); *B42D 25/405* (2014.10); *B32B 2255/10* (2013.01); *B32B 2255/24* (2013.01); *B32B 2255/28* (2013.01); *B32B 2425/00* (2013.01); *B41M 2205/04* (2013.01); *Y10T 428/24835* (2015.01)

(56) References Cited

U.S. PATENT DOCUMENTS

| | | | | |
|---|---|---|---|---|
| 4,663,518 A | | 5/1987 | Borror et al. | |
| 4,707,425 A | * | 11/1987 | Sasagawa | G03C 5/16 346/135.1 |
| 4,720,449 A | | 1/1988 | Borror et al. | |
| 4,772,541 A | * | 9/1988 | Gottschalk | C08F 2/50 430/170 |
| 5,166,041 A | * | 11/1992 | Murofushi | C09D 11/50 430/108.2 |
| 5,166,047 A | * | 11/1992 | Hioki | C09B 23/0066 430/573 |
| 5,409,797 A | * | 4/1995 | Hosoi | B41M 5/30 346/46 |
| 5,491,057 A | * | 2/1996 | Hioki | G03C 1/12 430/577 |
| 5,502,702 A | * | 3/1996 | Nakajo | G11B 7/0037 369/116 |
| 5,783,377 A | * | 7/1998 | Mee | G03C 1/127 430/522 |
| 5,948,600 A | * | 9/1999 | Roschger | B41M 5/32 430/200 |
| 7,158,145 B1 | | 1/2007 | Fannasch et al. | |
| 2002/0142236 A1 | * | 10/2002 | Iwasaki | G11B 23/40 430/19 |
| 2005/0225891 A1 | | 10/2005 | Tsuboi et al. | |
| 2006/0147833 A1 | | 7/2006 | Kasperchik et al. | |
| 2006/0276335 A1 | * | 12/2006 | Tsuboi | B41M 5/305 503/201 |
| 2008/0194403 A1 | * | 8/2008 | Natsui | B41M 5/465 503/201 |
| 2009/0263612 A1 | * | 10/2009 | Gascoyne | G11B 7/252 428/64.4 |
| 2011/0293908 A1 | * | 12/2011 | Jeganathan | C09K 9/02 428/211.1 |
| 2013/0335944 A1 | * | 12/2013 | Battis | F21K 9/17 362/20 |
| 2014/0099482 A1 | * | 4/2014 | Waumans | B41M 3/142 428/195.1 |
| 2014/0232810 A1 | * | 8/2014 | Waumans | B41M 3/142 347/232 |
| 2015/0261080 A1 | * | 9/2015 | Callant | C09B 23/0075 430/363 |
| 2015/0277221 A1 | * | 10/2015 | Waumans | B41M 5/323 430/2 |
| 2015/0290959 A1 | * | 10/2015 | Waumans | B32B 37/18 428/483 |
| 2015/0306887 A1 | * | 10/2015 | Waumans | B41J 2/435 347/102 |

FOREIGN PATENT DOCUMENTS

| | | | |
|---|---|---|---|
| EP | 1 391 315 A2 | | 2/2004 |
| EP | 2 181 858 A1 | | 5/2010 |
| EP | 2 463 096 A1 | | 6/2012 |
| JP | 05-072661 | * | 3/1993 |
| JP | 07-209858 | * | 8/1995 |
| JP | 2004-246035 | * | 9/2004 |
| WO | 2009/140083 A2 | | 11/2009 |

OTHER PUBLICATIONS

Official Communication issued in International Patent Application No. PCT/EP2013/071170, mailed on Dec. 9, 2013.
Callant et al., "Infrared Dyes for Laser Marking," U.S. Appl. No. 14/433,084, filed Apr. 2, 2015.
Waumans et al., "Colour Laser Marking," U.S. Appl. No. 14/433,086, filed Apr. 2, 2015.

* cited by examiner

COLOR LASER MARKING

CROSS-REFERENCE TO RELATED APPLICATIONS

This application is a 371 National Stage Application of PCT/EP2013/071170, filed Oct. 10, 2013. This application claims the benefit of U.S. Provisional Application No. 61/719,513, filed Oct. 29, 2012, which is incorporated by reference herein in its entirety. In addition, this application claims the benefit of European Application No. 12188143.7, filed Oct. 11, 2012, which is also incorporated by reference herein in its entirety.

BACKGROUND OF THE INVENTION

1. Field of the Invention

This invention relates to color laser marking of articles, especially security documents.

2. Description of the Related Art

Articles are laser marked in order to ensure product safety and authenticity. For example, packaging material of pharmaceuticals is laser marked to enable a consumer to verify the genuineness of a product. Laser marked security cards are widely used for various applications such as identification purposes (ID cards) and financial transfers (credit cards). Such cards typically consist of a laminated structure consisting of various papers or plastic laminates and layers wherein some of them may carry alphanumeric data and a picture of the card holder. So called 'smart cards' can also store digital information by including an electronic chip in the card body.

A principal objective of such articles and security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking an article, a color change is observed by local heating of material in the bulk of the article, while in laser engraving material is removed by ablation.

Today, laser marking employed in the manufacture of security documents consists solely of a "black" laser marking method via the carbonization of a polymer, usually polycarbonate as disclosed in e.g. EP 2181858 A (AGFA). Nevertheless, some modification of articles and security cards remains possible when made by the black laser marking method, since additional carbonization of the polymer can be performed on the articles and security cards.

There has been considerable interest in being able to produce multicolor images through laser marking. It would also be desirable to have a color laser markable article, which can also be "inactivated" after all the information has been marked on the article, meaning that no information can be added or removed from the article.

U.S. Pat. No. 7,158,145 (ORGA SYSTEMS) discloses a three-wavelength system (440, 532 and 660 nm) for applying colored information to a document by means of wavelength-selective bleaching of chromophoric particles in a layer close to the surface. Although a bleached color cannot be restored, modification of the colored information remains possible by extra bleaching.

EP 0174054 A (POLAROID) discloses a heat sensitive element used in a thermal imaging method for forming color images which relies upon the irreversible unimolecular fragmentation of one or more thermally unstable carbamate moieties of an organic compound to effect a visually discernible color shift from colorless to colored, from colored to colorless or from one color to another. EP 0174054 A (POLAROID) suggests using infrared absorbers that absorb radiation at 760 nm, 820 nm and 880 nm. There is however no disclosure how to prevent modification of the color image by additional laser marking, which is also the case for similar imaging methods disclosed in U.S. Pat. No. 4,720,449 (POLAROID), WO 2009/140083 (3M) and U.S. Pat. No. 4,663,518 (POLAROID).

U.S. Pat. No. 5,219,703 (KODAK) discloses a laser-induced thermal dye transfer imaging method wherein the infrared dye absorbs laser radiation and converts it into heat which vaporizes dyes in a dye-donor element and transfers them to a dye-receiver element. After transfer, the infrared dyes which cause an undesirable visual light absorption in the dye-receiver element are bleached by an acid-photogenerating compound formed by infrared or ultraviolet radiation exposure of the dye-receiver element.

A solution to hinder or prevent modification of a color image by additional laser marking would be to use the bleaching of the infrared dye in, for example, the color laser markable article of EP 0174054 A (POLAROID).

However, it was found that bleaching with UV radiation results in direct color formation from the colorless dye without the need for an infrared dye. The alternative bleaching method of using infrared radiation is simply not an option. In the thermal dye transfer imaging method, the color image is transferred and exposure of the dye-receiver element does not result on additional colored dyes being transferred. In a color laser markable article like that of EP 0174054 A (POLAROID), infrared exposure will simply result in undesired additional color formation.

Hence, there remains a need for having a secure color laser marking system, wherein modification by additional color laser marking of laser marked color image is hindered or prevented.

SUMMARY OF THE INVENTION

In order to overcome the problems described above, preferred embodiments of the present invention include a method for preparing a color laser marked article as defined below.

A region in the visual spectrum was surprisingly found wherein a post-exposure of a color laser marked article inactivated at least partially one or more color laser markable layers while creating minor or no undesired background density nor increasing optical densities of color laser marked area's on the color laser marked article.

Further advantages and preferred embodiments of the present invention will become apparent from the following description.

DETAILED DESCRIPTION OF THE PREFERRED EMBODIMENTS

Definitions

Figure 1:
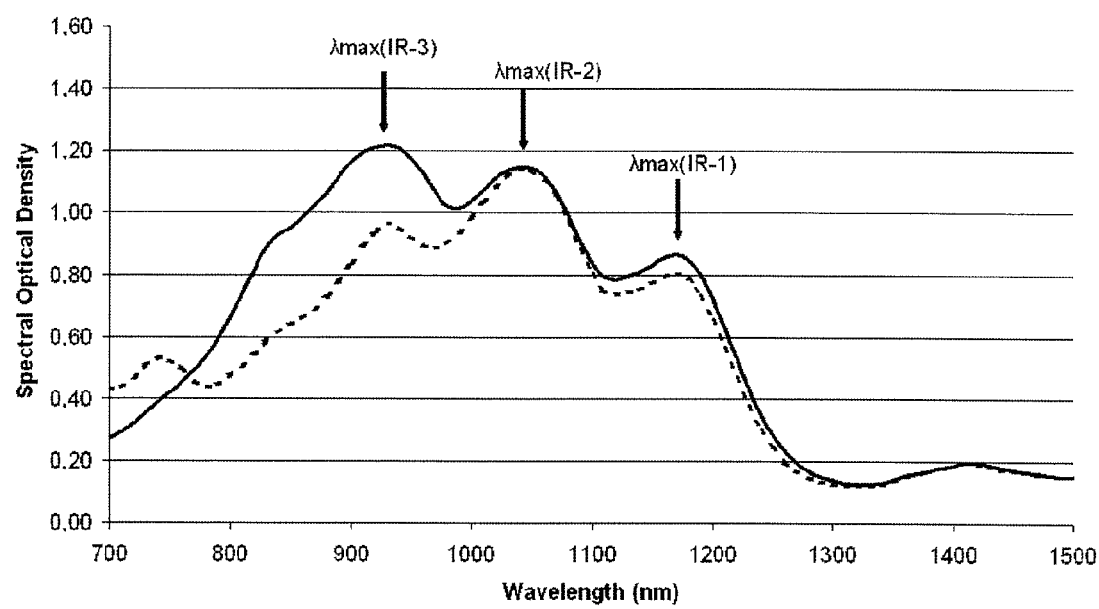
FIG. 1 shows the absorption spectrum from 700 to 1500 nm measured on a color laser marked article of Example 2 before exposure (solid line) and after exposure (dotted line).
Figure 2:
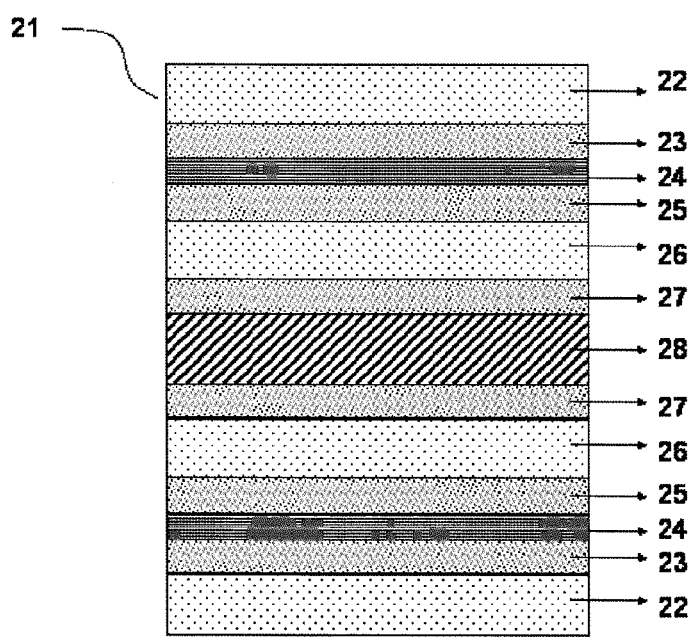
FIG. 2 shows a cross section of a symmetrical color laser markable article 21 including on both sides of an opaque core support 28, in order, a first color laser markable layer 27, a transparent polymeric support 26, a second color laser markable layer 25, an adhesive foil 24, a third color laser markable layer 23 and a transparent polymeric support 22.
Figure 3:
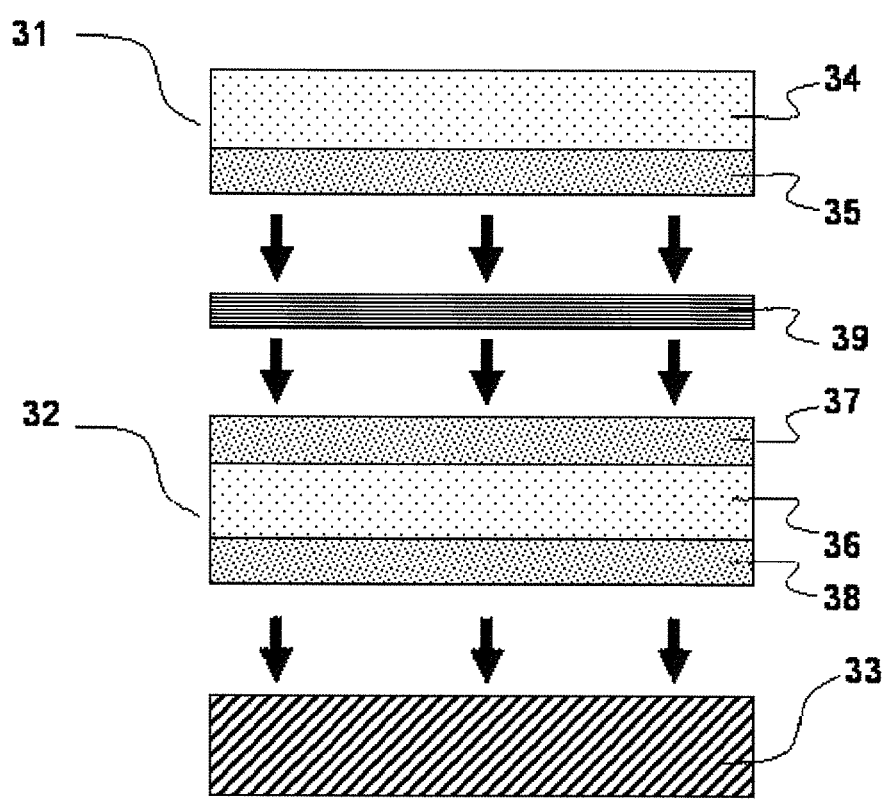
FIG. 3 shows a cross section of a preferred embodiment of an asymmetrical laser markable article wherein a color laser markable outer laminate 31 including a transparent polymeric support 34 and a laser markable layer 35, an adhesive foil 39, a color laser markable inner laminate 32 including a transparent polymeric support 36 and color laser markable layers 37 and 38 are laminated onto an opaque core support 33. The end result is a three-color asymmetrical laser markable article.

The terms "polymeric support" and "foil", as used herein, mean a self-supporting polymer-based sheet, which may be associated with one or more adhesion layers e.g. subbing layers. Supports and foils are usually manufactured through extrusion.

The term "layer", as used herein, is considered not to be self-supporting and is manufactured by coating it on a (polymeric) support or foil.

The term "leuco dye" as used herein refers to compounds which can change from essentially colorless to colored when heated.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

"PET-C" is an abbreviation for crystalline PET, i.e. a biaxially stretched polyethylene terephthalate. Such a polyethylene terephthalate support has excellent properties of dimensional stability.

The definition of "security feature" corresponds with the normal definition as adhered to in the "Glossary of Security Documents—Security features and other related technical terms" as published by the Consilium of the Council of the European Union on Sep. 12, 2012 (Version: v. 09916-08.R.2.C.1.en) on its website: http://www.consilium.europa.eu/prado/EN/glossaryPopup.html.

The term "alkyl" means all variants possible for each number of carbon atoms in the alkyl group i.e. methyl, ethyl, for three carbon atoms: n-propyl and isopropyl; for four carbon atoms: n-butyl, 1-isobutyl, 2-isobutyl and tertiary-butyl; for five carbon atoms: n-pentyl, 1,1-dimethyl-propyl, 2,2-dimethylpropyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably phenyl group or naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulphur atoms, selenium atoms or combinations thereof.

An alicyclic group is a non-aromatic homocyclic group wherein the ring atoms consist of carbon atoms.

The term "heteroaryl group" means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulfonamide, —Cl, —Br, —I, —OH, —SH, —CN and —NO$_2$.

Methods for Preparing Color Laser Markable Articles

A preferred embodiment of the present invention is a method for preparing a color laser marked article using three infrared lasers L-1, L-2 and L-3 having respectively a laser emission wavelength of λ(L-1), λ(L-2) and λ(L-3) and comprising the steps of: —laser marking with the infrared laser L-1 a first color laser markable layer including an infrared dye IR-1 having an absorption maximum in the infrared region $\lambda_{max}$(IR-1);

—laser marking with the infrared laser L-2 a second color laser markable layer including an infrared dye IR-2 having an absorption maximum in the infrared region $\lambda_{max}$(IR-2);

—laser marking with the infrared laser L-3 a third color laser markable layer including an infrared dye IR-3 having an absorption maximum in the infrared region $\lambda_{max}$(IR-3); and—at least partially exposing the color laser markable article to light having a wavelength between 520 nm and 700 nm; wherein, the laser emission wavelengths satisfy the condition of: λ(L-1)>λ(L-2)>λ(L-3); the infrared red dye absorption maxima satisfy the condition of: $\lambda_{max}$ (IR-1)> $\lambda_{max}$ (IR-2)>$\lambda_{max}$(IR-3); and the light emitted by the infrared laser L-1 passes, in order, through the third and second color laser markable layer before exposing the first color laser markable layer.

The at least partial exposure is performed with light having a wavelength between 520 nm and 700 nm, preferably between 530 nm and 680 nm, more preferably between 540 nm and 610 nm, and most preferably between 550 nm and 600 nm.

In a preferred embodiment of the color laser marking method, the laser marking of the first, second and third color laser markable layers is performed before the at least partial exposure of the color laser markable article to light having a wavelength between 520 nm and 700 nm. However, this order is not absolutely necessary. For example, if there is no or minor bleaching of the infrared dye IR-1, then the laser marking of the second and third color laser markable layers may be performed before the at least partial exposure, while the laser marking of the first color laser markable layer may be performed after the at least partial exposure. If there is some bleaching of the infrared dye IR-1, a slightly higher laser power may be required for the infrared laser L-1. However, it may also be the case that less laser power for the infrared laser L-1 is required, if there exists a substantial overlap of the infrared dye IR-2 in the wavelength region around $\lambda$(L-1). In the latter case, bleaching the infrared dye IR-2 reduces the amount of light absorbed by the color laser markable layer and allows for a cheaper laser L-1 of smaller laser power.

In a preferred embodiment, the laser marking of the first, second and third color laser markable layers is performed simultaneously. This allows for simplified laser optics and a higher productivity of preparing color laser marked articles compared to a sequential color laser marking of the first, second and third color laser markable layers.

In one embodiment, the laser marking of the first, second and third color laser markable layers an the at least partial exposure are all performed simultaneously. In the latter, the at least partial exposure is preferably performed by a laser having an emission wavelength between 520 nm and 700 nm, preferably between 530 nm and 680 nm, more preferably between 540 nm and 610 nm, and most preferably between 550 nm and 600 nm.

In a preferred embodiment of the color laser marking method, the infrared dye IR-3 having an absorption maximum in the infrared region $\lambda_{max}$(IR-3) of more than 800 nm, preferably more than 830 nm, more preferably more than 850 nm and most preferably even more than 900 nm. The advantage is that by increasing the absorption maximum wavelength, that minimal background density is formed by the exposure of the color laser markable article to light having a wavelength between 520 nm and 700 nm.

In a very preferred embodiment of the color laser marking method, the infrared dye IR-3 fulfils the condition of 800 nm<$\lambda_{max}$(IR-3)<1000 nm, preferably 830 nm<$\lambda_{max}$(IR-3)<980 nm, more preferably 850 nm<$\lambda_{max}$(IR-3)<960 nm and most preferably 900 nm<$\lambda_{max}$(IR-3)<940 nm. Wavelengths of 1000 nm or more for the absorption maximum of the infrared dye IR-3, require the absorption maxima of the infrared dyes IR-1 and IR-2 to have very high wavelengths in order to avoid color fogging. As the wavelength for the infrared dye IR-1 increases, the choice of available infrared dyes becomes very limited. Above 1100 nm no commercially available infrared dyes were even found. Hence, the current invention also includes the development of new infrared dyes having an absorption maximum higher than 1100 nm, so that minimal color fogging could be realized.

In a very preferred embodiment of the color laser marking method, the conditions of $\lambda_{max}$(IR-1)>1100 nm and $\lambda_{max}$(IR-3)<1000 nm are fulfilled.

In a preferred embodiment, $\lambda_{max}$(IR-2) differs by at least 70 nm from $\lambda_{max}$(IR-1) and $\lambda_{max}$(IR-3) for realizing minimal color fogging.

In a preferred embodiment, the emission wavelengths of the infrared lasers L-1, L-2 and L-3 are selected to fulfil the following conditions: a) $\lambda$(L-1)>1100 nm; b) 1000 nm<$\lambda$(L-2)<1100 nm; and c) $\lambda$(L-3)<1000 nm.

In a very preferred embodiment, the emission wavelength of the infrared laser L-1 is between 1125 nm and 1200 nm.

Color fogging is also minimized by using the lasers in a wavelength range near the absorption maximum of the corresponding infrared dye. Preferably the laser emission wavelengths $\lambda$(L-1), $\lambda$(L-2) and $\lambda$(L-3) differ by no more than 30 nm from the infrared red dye absorption maxima $\lambda_{max}$(IR-1), $\lambda_{max}$(IR-2) and respectively $\lambda_{max}$(IR-3).

There is no real limitation on the light source used for at least partially exposing the color laser markable article to light having a wavelength between 520 nm and 700 nm. In a preferred embodiment this at least partial exposure is performed using a laser or a LED, more preferably using a laser.

The term "partially" in at least partially exposing the color laser markable article to light having a wavelength between 520 nm and 700 nm is used in the sense of partially inactivating the infrared dye and/or in the sense of inactivating only certain area's of the color laser markable article.

It is not required to inactivate infrared dyes completely in order to make fraudulent modification of a color laser marked article difficult or impossible. For example, an issuer of security documents can make the inactivation variable not only from one color laser markable layer to another but also from one security document to another security document. A falsifier of a security document normally has only one opportunity to falsify the security document and when he does not know how much of the infrared dye has been inactivated, the falsification becomes very difficult. An incomplete inactivation of the infrared dyes also has the advantage of achieving higher productivity in producing color laser marked articles.

Another way is to inactivate certain area's and other area's not or less. In a preferred embodiment, an area is inactivated in the shape of an image or text. For example, a security document may be secured by inactivating it over its whole surface in the shape of the word "fake". The word "fake" is not visible on the color laser marked article, since its absorbance is located in the infrared region. However, upon color laser marking the word becomes visible since no color is formed in the area of inactivation.

In a preferred embodiment, a color laser marked article is secured by a partial inactivation of the infrared dye in only certain areas of the color laser markable article. Preferably such inactivation is also made variable from one color laser marked article to another.

In another preferred embodiment, the at least partial exposure of the method for preparing a color laser marked article is performed according to an image, e.g. a photograph of the card holder. Such an image allows verification of the color laser marked article by inspection under infrared light.

In yet another preferred embodiment, the at least partial exposure of the method for preparing a color laser marked article is an overall exposure, wherein all infrared dyes are fully inactivated over the whole surface area of the color laser marked article. The advantage is that modification is no longer possible, however it takes much longer time to inactivate a color laser marked article which reduces productivity in providing e.g. security documents.

In a preferred embodiment, the color laser markable article is laser marked through a transparent biaxially stretched polyethylene terephthalate foil (PET-C), which is preferably used at least as the outermost foil. This PET-C foil may, for example, be used as the support for the color laser markable layer containing the infrared dye IR-3.

The PET-C foil brings not only additional protection against falsification due to its solvent resistance, but also against wear in daily life. Biaxially stretched polyethylene terephthalate foils are very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc. —ready for immediate use. PVC (polyvinylchloride) is the most widely used material for plastic cards but has low durability of the card body, resulting in an effective lifetime of only 1-3 years, much lower than the lifetime of the often expensive electronic chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

Color Laser Marked Articles

A preferred embodiment of the present invention is a color laser marked article containing, in order, at least: a) a core support; b) a first color laser markable layer including an infrared dye IR-1 having an absorption maximum in the infrared region $\lambda_{max}$(IR-1); c) a second color laser markable layer including an infrared dye IR-2 having an absorption maximum in the infrared region $\lambda_{max}$(IR-2); and d) a third color laser markable layer including an infrared dye IR-3 having an absorption maximum in the infrared region $\lambda_{max}$(IR-3); wherein the infrared dye absorption maxima satisfy the condition of:

$$\lambda_{max}(\text{IR-1}) > \lambda_{max}(\text{IR-2}) > \lambda_{max}(\text{IR-3}); \text{ and}$$

wherein the absorption of the infrared dye IR-3 at $\lambda_{max}$(IR-3) differs by at least 10% in two area's on the same side of the core support having the same optical density when measured by a spectrophotometer equipped with a visual filter. The absorption of the infrared dye differs by at least 10% in two area's on the same side of the core support having the same optical density due to the at least partially exposure of the color laser markable article to light having a wavelength between 520 nm and 700 nm. In industrial coating of color laser markable layers on a support, the absorption of the infrared dye differs no more than 5%, usually no more than 2% in two areas on the same side of the core support.

The same optical density means preferably identical optical densities (e.g. 0.23 and 0.23), but should in any case differ no more than 2% (e.g. 1.20 and 1.22).

In a more preferred embodiment of the color laser marked article, the absorption of the infrared dye IR-1 at $\lambda_{max}$(IR-1) differs by no more than 5% in the same two area's on the same side of the core support.

In a preferred embodiment, the color laser marked article fulfils the condition of 800 nm<$\lambda_{max}$(IR-3)<1000 nm, preferably 830 nm<$\lambda_{max}$(IR-3)<980 nm, more preferably 850 nm<$\lambda_{max}$(IR-3)<960 nm and most preferably 900 nm<$\lambda_{max}$(IR-3)<940 nm.

In a preferred embodiment, $\lambda_{max}$(IR-2) differs by at least 70 nm from $\lambda_{max}$(IR-1) and $\lambda_{max}$(IR-3).

$\lambda_{max}$(IR) is the wavelength of the absorption maximum in the infrared spectrum from 700 to 1500 nm. The $\lambda_{max}$(IR-1), $\lambda_{max}$(IR-2) and $\lambda_{max}$(IR-3) are preferably measured by absorption spectroscopy on a coated layer, since the value of $\lambda_{max}$ may differ somewhat, although usually no more than 10 nm, on the type of solvent used in an infrared dye solution.

In a preferred embodiment, the infrared dye IR-1 has an absorption maximum in the infrared region $\lambda_{max}$(IR-1) 1125 nm, more preferably $\lambda_{max}$(IR-1) 1140 nm and most preferably $\lambda_{max}$(IR-1) 1150 nm. This allows selecting infrared lasers for the three color laser markable layers that differ by more than 60 nm, more preferably by at least 80 nm, and most preferably by at least 90 nm from each other. The infrared dye IR-1 preferably having a chemical structure A-B-C as defined below.

The color laser marked article is preferably a security document selected from the group consisting of a passport, a personal identification card and a product identification document.

In a preferred embodiment, the color laser marked article is a security document having a format as specified by ISO 7810. ISO 7810 specifies three formats for identification documents: ID-1 with the dimensions 85.60 mm×53.98 mm, and a thickness of 0.76 mm as specified in ISO 7813, as used for bank cards, credit cards, driving licenses and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contactless integrated circuits then a larger thickness is tolerated, e.g. 3 mm according to ISO 14443-1. In another preferred embodiment, the color laser marked article is a security document including electronic circuitry, more preferably the electronic circuitry includes a RFID chip with an antenna and/or a contact chip. Inclusion of electronic circuitry makes forgery more difficult.

The color laser marked article according to a preferred embodiment of the present invention includes at least three color laser markable layers, but may include additional color laser markable layers e.g. for producing a spot color or further increasing the color gamut. However since color contamination is minimized in color laser marked articles according to a preferred embodiment of the present invention, an appropriate selection of the color forming compounds, preferably leuco dyes, in the color laser markable layers allows maximizing the color gamut without requiring additional color laser markable layers.

In a preferred embodiment of the color laser marked article, the three color laser markable layers each include a different leuco dye for forming a color having an absorption maximum $\lambda_{max}$ (VIS-1), $\lambda_{max}$ (VIS-2), respectively $\lambda_{max}$ (VIS-3) in the visible spectrum of 400 nm to 700 nm, wherein all the relations a) to c) are fulfilled: a) 400 nm<$\lambda_{max}$(VIS-1)<500 nm; b) 500 nm<$\lambda_{max}$(VIS-2)<600 nm; and c) 600 nm<$\lambda_{max}$(VIS-3)<700 nm.

In a preferred embodiment, the color laser marked article includes three color laser markable layers on one side or on both sides of an opaque white core support. Preferably one of the three color laser markable layers is capable of forming a cyan or blue color image on laser marking, while the two other laser markable layers are capable of forming a magenta color or a yellow color respectively or otherwise capable of forming a red color or a green color respectively. The advantage is that readily available color management systems for producing color images based on either a CMY or RGB color reproduction can be used.

In addition to the colors formed from the leuco dyes, it is preferred that the color laser markable article is also capable of producing a black color.

In a preferred embodiment, the black color is produced by using the infrared laser, preferably the infrared laser used for the color laser markable layer capable of forming a cyan or blue color image on laser marking, in different laser operation modes as disclosed by WO 2012/076493 (AGFA). The advantage of using the infrared laser of the color laser markable layer forming a cyan or blue color image is that a neutral black color is formed which is more appealing than a brownish black color which would be formed on using the infrared laser for the color laser markable layer capable of forming e.g. a yellow or a magenta color image on laser marking.

In a more preferred embodiment, the color laser marked article includes a laser markable polymeric support or a laser markable layer for generating a black color as disclosed by EP 2463109 A (AGFA) also capable of producing different shades of black. The laser markable polymeric support for generating a black color may be an additional foil or laminate, but is preferably the (opaque) core support or a transparent polymeric support of the color laser markable layer.

The color laser marked article is preferably to a large degree symmetrical or more preferably completely symmetrical. Completely symmetrical means that the same type and number of layers and foils are present on both sides of the core support. The advantage thereof is that curl of the color laser markable article is minimized. An asymmetrical color laser markable article often exhibits curl and usually requires a thermal relaxation in order to obtain e.g. a flat asymmetrical ID card.

Color Laser Markable Layers

The color laser markable layers in the color laser marked article according to a preferred embodiment of the present invention contain an infrared dye for the conversion of electromagnetic radiation into heat when the color laser markable layer is exposed by the infrared laser.

A color laser markable layer includes preferably at least an infrared dye, a polymeric binder and a substantially colorless compound, preferably a leuco dye. Color is produced in the color laser markable layer by a chemical reaction converting the substantially colorless compound into a dye, wherein the chemical reaction is triggered by local heating with an infrared laser having an emission wavelength matching the absorption maximum of the infrared dye. Preferably, a laser emission wavelength is selected within a range of ±30 nm of the absorption maximum in the infrared region $\lambda_{max}(IR)$ of the infrared dye.

The infrared dye not only delivers the heat for the color forming action, but also has the advantage that there is no or minimal absorption in the visible spectrum and thus there is no or minimal interference with the color formed by the laser markable layer. This makes a pure white background possible, which is often desired in e.g. a security document.

The color laser markable layers can be coated onto a support by any conventional coating technique, such as dip coating, knife coating, extrusion coating, spin coating, slide hopper coating and curtain coating. Preferably the laser markable layer is coated with a slide hopper coater or a curtain coater, more preferably coated onto a transparent polymeric support including a subbing layer.

The dry thickness of the color laser markable layer is preferably between 4 and 40 g/m², more preferably between 5 and 25 g/m², and most preferably between 6 and 15 g/m².

Infrared Dyes

The color laser marked article includes at least three color laser markable layers containing different infrared dyes and color forming compounds. The infrared dyes differ in wavelength of maximum absorption $\lambda_{max}$ so that they can be addressed by different infrared lasers with corresponding emission wavelengths causing color formation only in the color laser markable layer of the addressed infrared dye.

The color laser marked article contains three or more color laser markable layers having different infrared dyes and different leuco dyes on the same side of a core support for producing a multi-colored article. The different infrared dyes have an absorption maximum in the infrared region which differs preferably by at least 60 nm, more preferably at least 80 nm and most preferably at least 90 nm.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The infrared dye is preferably present in the color laser markable layer in an amount of 0.01 to 1.0 g/m², more preferably in an amount of 0.02 to 0.5 g/m² and most preferably in an amount of 0.05 to 0.2 g/m². An amount of less than 0.01 g/m² requires a too high laser power and an amount of more than 0.5 g/m² may result in background discoloration.

Infrared Dyes with $\lambda_{max}$(IR-1)

In a preferred embodiment of the color laser marked article, the infrared dye IR-1 has a absorption maximum of more than 1100 nm and a chemical structure A-B-C consisting of a dye cation and an anion to compensate the charge of the dye cation, wherein the nucleus group A of the dye cation is selected from NucA-1 to NucA-3:

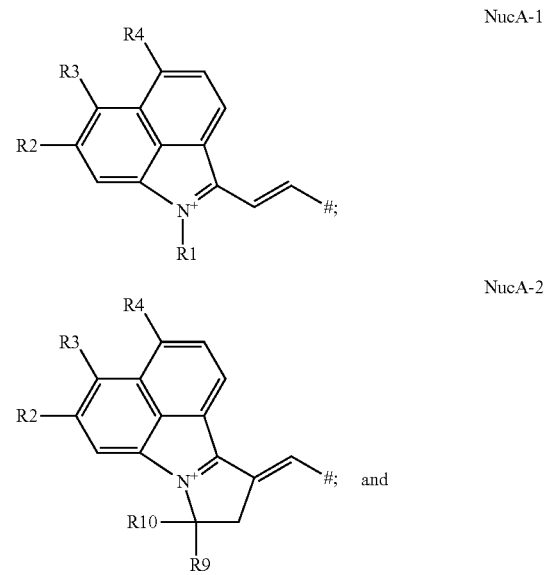

-continued

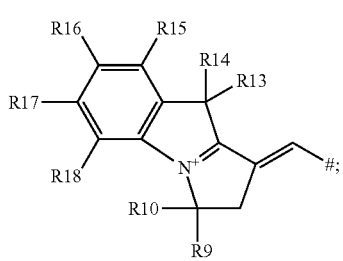

wherein the chain group B of the dye cation is selected from ChB-1 to ChB-9:

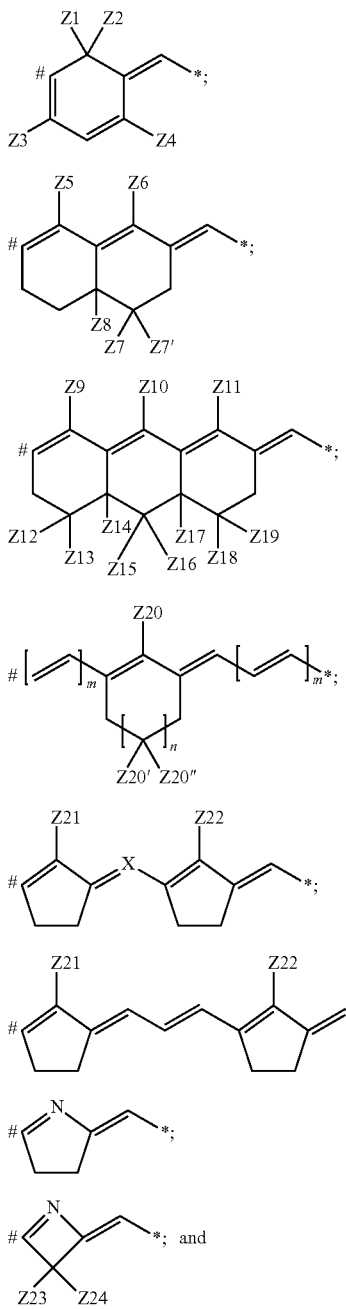

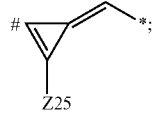

and
wherein the nucleus group C of the dye cation is selected from NucC-1 to NucC-3:

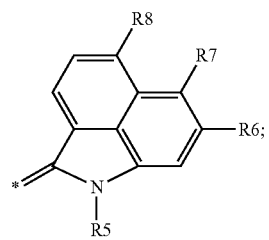

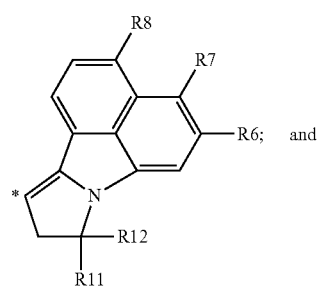

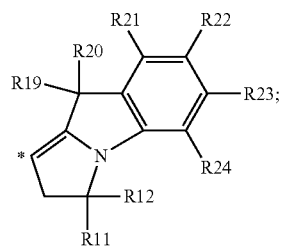

with # indicating the point of attachment between groups A and B;
with * indicating the point of attachment between groups B and C; and
wherein, R1 and R5 each independently represent an alkyl group having 1 to 10 carbon atoms; R3 and R7 each independently represent hydrogen, an alkoxy group having 1 to 10 carbon atoms; a thioalkyl group having 1 to 10 carbon atoms; a cyanide group; an ester group having 2 to 6 carbon atoms; an amide group having 2 to 6 carbon atoms; or a halogen;
R2, R4, R6 and R8 represent hydrogen; or R2 and R3 may represent the necessary atoms to form a five- or six-membered ring including an oxygen or nitrogen atom directly attached to the carbon atom carrying the R3 group; R4 and R3 may represent the necessary atoms to form a five- or six-membered ring including an oxygen or nitrogen atom directly attached to the carbon atom carrying the R3 group; R6 and R7 may represent the necessary atoms to form a five- or six-membered ring including an oxygen or nitrogen atom directly attached to the carbon atom carrying the R7 group; R8 and R7 may represent the necessary atoms to form a five- or six-membered ring including an oxygen or nitrogen atom directly attached to the carbon atom carrying the R7 group; R9 to R12 each independently represent hydrogen or an alkyl group having 1 to 8 carbon atoms, or R9 and R10 and/or R11 and R12 may represent the necessary atoms to form an alicyclic five- or six-membered ring; R13, R14, R19, R20 each independently represent an alkyl group having 1 to 8 carbon atoms; R15 to R18 each independently represent hydrogen or one of R15 and R16, R16 and R17 or R17 and R18 may represent the necessary atoms to form a benzene ring; R21 to R24 each independently represent hydrogen or one of R21 and R22, R22 and R23 or R23 and R24 may represent the necessary atoms to form a benzene ring; Z1 and Z2 each independently represent an alkyl group having 1 to 6 carbon atoms, a cyanide group, an ester group having 2 to 6 carbon atoms, an amide group having 2 to 6 carbon atoms, an alicyclic group having 5 to 14 carbon atoms, a heterocyclic group having 2 to 14 carbon atoms, an aryl group having 6 to 14 carbon atoms or a heteroaryl group having 2 to 14 carbon atoms; or Z1 and Z2 may represent the necessary atoms to form an alicyclic group having 5 to 14 carbon atoms or a heterocyclic group having 4 to 14 carbon atoms; Z3 to Z6 each independently represent hydrogen or halogen; Z7 and Z7' each independently represent hydrogen, an alkyl group having 1 to 6 carbon atoms, a cyanide group, an ester group having 2 to 6 carbon atoms, an amide group having 2 to 6 carbon atoms, an alicyclic group having 5 to 14 carbon atoms, a heterocyclic group having 2 to 14 carbon atoms, an aryl group having 6 to 14 carbon atoms or a heteroaryl group having 4 to 14 carbon atoms, or Z7 and Z7' may represent the necessary atoms to form an alicyclic group having 5 to 14 carbon atoms or a heterocyclic group having 4 to 14 carbon atoms; Z8 represents hydrogen or if at least one of Z7 and Z7' represents hydrogen Z8 may represent an alkyl group having 1 to 6 carbon atoms, a cyanide group, an ester group having 2 to 6 carbon atoms, an amide group having 1 to 6 carbon atoms or an aryl group having 6 to 14 carbon atoms; Z9, Z10 and Z11 each independently represent hydrogen or halogen; Z12 to Z19 each independently represent hydrogen, an alkyl group having 1 to 6 carbon atoms, an aryl group having 6 to 14 carbon atoms, or a heteroaryl group having 2 to 14 carbon atoms, a cyanide group, an ester group having 2 to 6 carbon atoms, an amide group having 2 to 6 carbon atoms or, one or more of Z12 and Z13, Z15 and Z16 and Z18 and Z19 may represent the necessary atoms to form an alicyclic group having 5 to 14 carbon atoms or a heterocyclic group having 4 to 14 carbon atoms; Z20 represents hydrogen, a halogen, a thioalkyl group having 1 to 8 carbon atoms, a thioaryl group having 5 to 14 carbon atoms, a thioheteroaryl group having 3 to 14 carbon atoms, an aryl group having 6 to 14 carbon atoms, a diarylamino group, an alkylsulfonyl group having 1 to 8 carbon atoms, an arylsulfonyl group having 6 to 14 carbon atoms or a heteroarylsulfonyl group having 2 to 14 carbon atoms; the integers m and n independently have a value of 0 or 1; Z20' and Z20" each independently represent hydrogen, an alkyl group having 1 to 8 carbon atoms, a cyanide group, an ester group having 2 to 8 carbon atoms, an amide group having 2 to 8 carbon atoms or an aryl group having 6 to 14 carbon atoms or Z20' and Z20" may represent the necessary atoms to form an alicyclic group having 5 to 14 carbon atoms or a heterocyclic group having 4 to 14 carbon atoms; Z21 and Z22 each independently represent hydrogen, halogen, a thio-alkyl group having 1 to 8 carbon atoms or a thioaryl group having 5 to 14 carbon atoms; X represents nitrogen, a —CH-group or if both Z21 and Z22 represent hydrogen then X may represent a —CR-group with R representing an aryl group having 6 to 14 carbon atoms; Z23 and Z24 each independently represent an alkyl group having 1 to 8 carbon atoms, an aryl group having 6 to 14 carbon atoms or Z23 and Z24 may represent the necessary atoms to form a five- or six-membered ring; Z25 represents hydrogen or an aryl group; with the proviso that when the chain group ChB-4 with the integer m=0 is combined simultaneously with NucA-1 and NucC-1 that R3 and R6 do not represent hydrogen.

In the above description of the infrared # and * indicate the point of attachment between groups A and B, respectively the point of attachment between groups B and C. The concept of this is exemplified here below by Formula (I) for an infrared dye A-B-C having one anion A⁻ and a dye cation with NucA-1 as the nucleus group A, ChB-1 as the chain group B and NucC-1 as the nucleus group C:

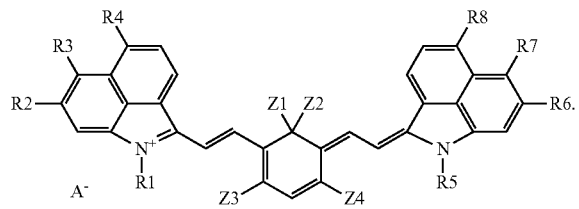

Formula (I)

The infrared dye has an absorption maximum in the infrared region $\lambda_{max}$(IR) of larger than 1100 nm, preferably between 1125 nm and 1400 nm, more preferably between 1140 nm and 1300 nm, most preferably between 1150 nm and 1200 nm as measured by absorption spectroscopy in methylene chloride including $6.5 \times 10^{-6}$ wt % of methanesulfonic acid based on the total weight of methylenechloride.

In a preferred embodiment, the infrared dye having a dye cation with the A-B-C chemical structure includes as the nuclei A respectively C, one of the combinations NucA-1 and NucC-1, NucA-2 and NucC-2 and NucA-3 and NucC-3, more preferably one of the combination NucA-1 and NucC-1 and NucA-2 and NucC-2, and most preferably the combination NucA-2 and NucC-2.

In a particularly preferred embodiment, the infrared dye having a dye cation with the A-B-C chemical structure includes NucA-2 and NucC-2 as the nuclei A respectively C, and ChB-4 as the chain group, more preferably the chain group ChB-4 with Z20 representing a phenyl group, an alkylsulfonyl group containing 1 to 8 carbon atoms, an arylsulfonyl group containing 6 to 14 carbon atoms or a heteroarylsulfonyl group containing 2 to 14 carbon atoms, most preferably the integers m and n have a value of 0.

In a preferred embodiment of the infrared dye, the integer n has a value of 0, because it was observed that a larger background discoloration was obtained when the integer n has a value of 1.

In a preferred embodiment of the infrared dye, the integer m has a value of 0 for reasons of chemical stability.

In a preferred embodiment of the infrared dye, R1 and R5 each independently represent a branched alkyl group, more preferably an α-branched alkyl group and most preferably an asymmetrical α-branched alkyl group. It was observed that the solubility of the infrared dye drastically increases by using a branched alkyl group. The solubility of the infrared dye increases further from a branched alkyl group to an α-branched alkyl group to an asymmetrical α-branched alkyl group.

The meaning of an asymmetrical α-branched alkyl group is explained using the nucleus NucA-1 according to Formula (II):

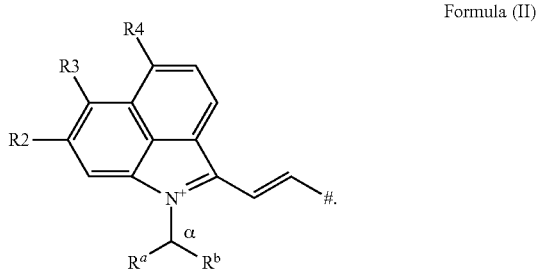

Formula (II)

The first carbon atom of R1 attached to nitrogen in Formula (I) is the α-carbon atom where the branching of the alkyl group takes place in case of an α-branched alkyl group R1 having 1 to 10 carbon atoms. In an asymmetrical α-branched alkyl group, the groups $R^a$ and $R^b$ differ from each other.

The groups R1 and R5 in the nucleus NucA-1 respectively the nucleus NucC-1 are preferably represented by $CHR^aR^b$, wherein $R^a$ represents hydrogen or an alkyl group including 1 to 4 carbon atoms and $R^b$ represents an alkyl group including 1 to 9 carbon atoms, more preferably $R^a$ represents an alkyl group including 1 to 4 carbon atoms and $R^b$ represents an alkyl group including 1 to 8 carbon atoms, and even more preferably $R^a$ represents an alkyl group including 1 to 4 carbon atoms and $R^b$ represents an alkyl group including 2 to 8 carbon atoms, and most preferably the groups $R^a$ and $R^b$ differ from each other and $R^a$ represents an alkyl group including 1 to 4 carbon atoms and $R^b$ represents an alkyl group including 2 to 8 carbon atoms.

In a preferred embodiment of the infrared dye, R2, R4, R6 and R8 represent hydrogen, more preferably R2 to R4 and R6 to R8 all represent hydrogen.

In a preferred embodiment of the infrared dye, R2 to R4 and R6 to R8 all represent hydrogen and R1 and R5 each independently represent a branched alkyl group, more preferably an α-branched alkyl group and most preferably an asymmetrical α-branched alkyl group.

In a preferred embodiment of the infrared dye, R9 to R12 each independently represent an alkyl group having 1 to 8 carbon atoms.

In a preferred embodiment of the infrared dye, R15 to R18 each independently represent hydrogen or one of R15 and R16, R16 and R17 or R17 and R18 represent the necessary atoms to form an unsubstituted benzene ring.

In a preferred embodiment of the infrared dye, R21 to R24 each independently represent hydrogen or one of R21 and R22, R22 and R23 or R23 and R24 represent the necessary atoms to form an unsubstituted benzene ring.

In a preferred embodiment, the infrared dye having a dye cation with the A-B-C chemical structure includes a chain group B selected from the group consisting of ChB-1 to ChB-6.

In a particularly preferred embodiment, the infrared dye having a dye cation with the A-B-C chemical structure includes NucA-1 and NucC-1 as the nuclei A respectively C, and ChB-4 as the chain group, more preferably the chain group ChB-4 with Z20 representing a phenyl group, a diphenylamino group, an alkylsulfonyl group containing 1 to 8 carbon atoms, an arylsulfonyl group containing 6 to 14 carbon atoms or a heteroarylsulfonyl group containing 2 to 14 carbon atoms, even more preferably the chain group ChB-4 with Z20 representing a phenylsulfonyl group, a para-nitrophenylsulfonyl group, a para-alkoxyphenylsulfonyl group wherein the alkoxy group contains 1 to 6 carbon atoms or a para-chlorophenylsulfonyl group, and most preferably the integers m and n have a value of 0.

In a preferred embodiment of the infrared dye, Z1 and Z2 represent a cyclic group selected from the group consisting of a cyclopentane-1,3-dione group and a barbituric acid group, preferably a barbituric acid group wherein the nitrogen atoms are substituted by an alkyl group, an aryl group, an alkaryl group or an aralkyl group.

In a preferred embodiment of the infrared dye, Z3 and Z4 represent hydrogen or chlorine, more preferably hydrogen.

In a preferred embodiment of the infrared dye, Z3 and Z4 each independently represent hydrogen or chlorine, more preferably Z3 and Z4 represent hydrogen or chlorine, and most preferably Z3 and Z4 represent hydrogen.

In a preferred embodiment of the infrared dye, Z5 and Z6 each independently represent hydrogen or chlorine, more preferably at least one of Z5 and Z6 represents chlorine.

In a preferred embodiment of the infrared dye, Z7 and Z7' represent the necessary atoms for forming preferably a barbituric acid group wherein the nitrogen atoms are substituted by an alkyl group, an aryl group, an alkaryl group or an aralkyl group.

In a particularly preferred embodiment of the infrared dye, Z5 represents chlorine; Z6 represents hydrogen; and Z7 and Z7' represent the necessary atoms for forming preferably a barbituric acid group wherein the nitrogen atoms are substituted by an alkyl group, an aryl group, an alkaryl group or an aralkyl group.

In a preferred embodiment of the infrared dye, Z9 to Z11 all represent hydrogen or one or two of Z9 to Z10 represents chlorine.

In one preferred embodiment of the infrared dye, Z12 to Z19 all represent hydrogen.

In one preferred embodiment of the infrared dye, Z20, Z21 and Z22 all represent chlorine.

In another preferred embodiment, Z20 represents a phenyl group, a diphenylamino group, an alkylsulfonyl group containing 1 to 8 carbon atoms, an arylsulfonyl group containing 6 to 14 carbon atoms or a heteroarylsulfonyl group containing 2 to 14 carbon atoms, more preferably Z20 represents a phenylsulfonyl group, a para-nitrophenylsulfonyl group, a para-alkoxyphenylsulfonyl group wherein the alkoxy group contains 1 to 6 carbon atoms or a para-chlorophenylsulfonyl group, and most preferably the integers m and n have a value of 0.

In a preferred embodiment of the infrared dye, Z21 and Z22 each independently represent hydrogen or halogen, more preferably hydrogen.

In a preferred embodiment of the infrared dye, X represents nitrogen or a —CH-group, more preferably a —CH-group.

In a preferred embodiment of the infrared dye, Z23 and Z24 both represent a methyl group or ethyl group, more preferably Z23 and Z24 both represent a methyl group.

In a preferred embodiment of the infrared dye, Z1 and Z2 represent a cyclic group selected from the group consisting of a cyclopentane-1,3-dione group and a barbituric acid group wherein the nitrogen atoms are substituted by an alkyl group, an aryl group, an alkaryl group or an aralkyl group;

Z3 and Z4 represent hydrogen; Z5 and Z6 each independently represent hydrogen or chlorine, more preferably at least one of Z5 and Z6 represents chlorine; Z7 and Z7' represent the necessary atoms for forming a barbituric acid group, preferably a barbituric acid group wherein the nitrogen atoms are substituted by an alkyl group, an aryl group, an alkaryl group or an aralkyl group; Z9 to Z11 all represent hydrogen; Z12 to Z19 all represent hydrogen; and Z20 to Z22 all represent chlorine.

In a preferred embodiment of the infrared dye, the anion to compensate the charge of the dye cation is selected from the group consisting of chloride, bromide and iodide ions, fluoroalkylsulfonates, arylsulfonates and alkylsulfonates.

In a more preferred embodiment of the infrared dye, the anion to compensate the charge of the dye cation is selected from the group consisting of a chloride ion, triflate, 1,1,1-trifluoroethanesulfonate, pentafluoroethanesulfonate, nonafluorobutanesulfonate, tosylate, benzenesulfonate, 4-fluorobenzenesulfonate, 1,2,3,4,5-pentafluorobenzenesulfonate, mesylate and butanesulfonate.

In a preferred embodiment of the infrared dye, the anion to compensate the charge of the dye cation is a non-fluorinated anion. The advantage is that the infrared dyes could be prepared lacking fluorinated anions to compensate the charge of the dye cation without causing problems of dye solubility in an apolar medium or having ecologically undesirable fluorinated waste in the synthesis of the infrared dyes. This is especially the case for the infrared dyes having a dye cation with the A-B-C chemical structure including NucA-1 and NucC-1 as the nuclei A respectively C, wherein R1 and R5 each independently represent a branched alkyl group, more preferably an α-branched alkyl group and most preferably an asymmetrical α-branched alkyl group.

In a particularly preferred embodiment, the infrared dye having a dye cation with the A-B-C chemical structure includes a non-fluorinated anion to compensate the charge of the dye cation having NucA-1 and NucC-1 as the nuclei A respectively C, wherein R1 and R5 each independently represent a branched alkyl group, more preferably an α-branched alkyl group and most preferably an asymmetrical α-branched alkyl group; and ChB-4 as the chain group, more preferably the chain group ChB-4 with Z20 representing an alkylsulfonyl group containing 1 to 8 carbon atoms, an arylsulfonyl group containing 6 to 14 carbon atoms or a heteroarylsulfonyl group containing 2 to 14 carbon atoms, most preferably the chain group ChB-4 with Z20 representing a phenylsulfonyl group, a para-nitrophenylsulfonyl group, a para-alkoxyphenylsulfonyl group wherein the alkoxy group contains 1 to 6 carbon atoms or a para-chlorophenylsulfonyl group.

Preferred nucleus groups A are shown in Table 1 without being limited thereto.

TABLE 1

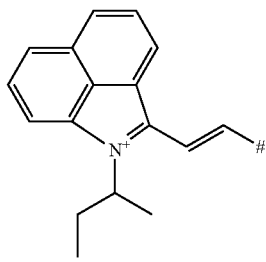

NA-1

TABLE 1-continued

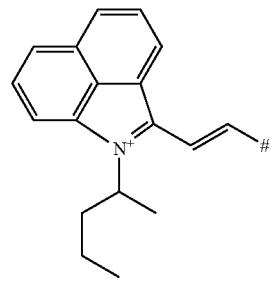

NA-2

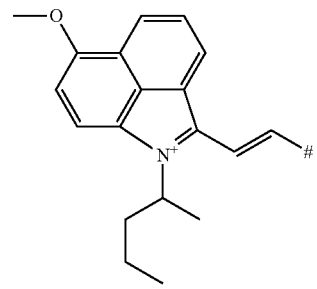

NA-3

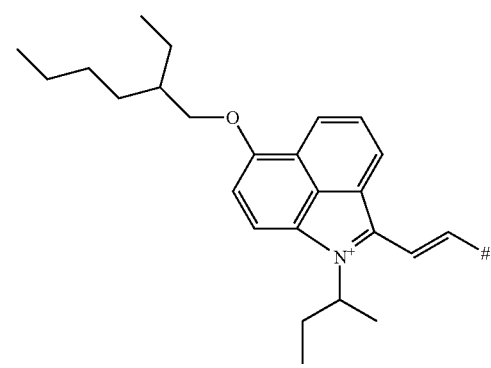

NA-4

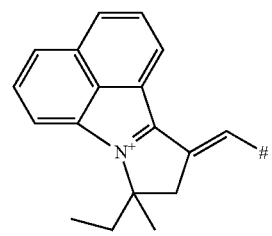

NA-5

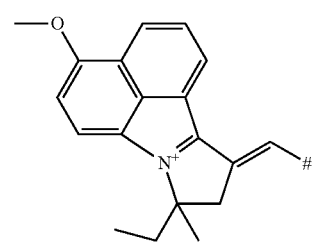

NA-6

TABLE 1-continued
NA-7
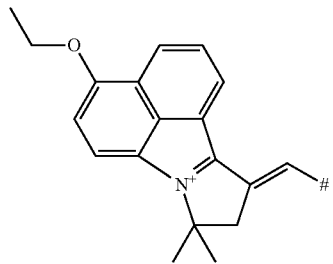
NA-8
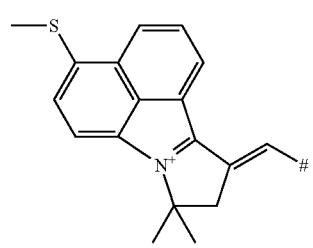
NA-9
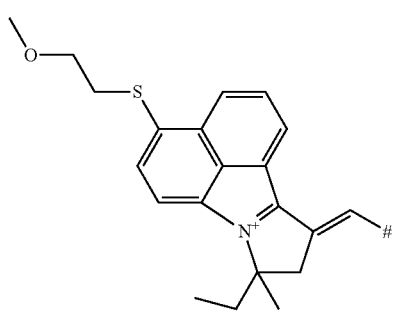
NA-10
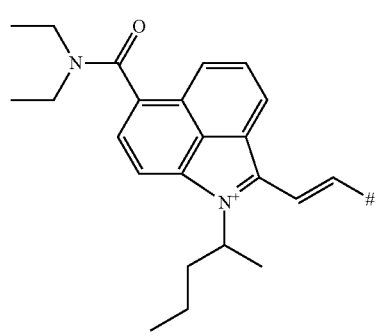
NA-11
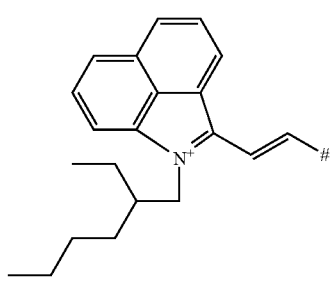
TABLE 1-continued
NA-12
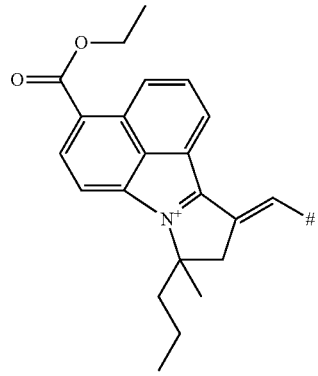
NA-13
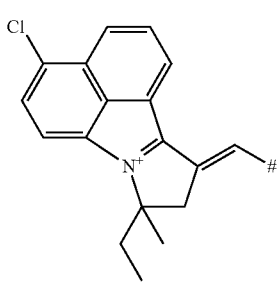
NA-14
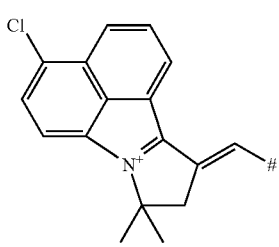
NA-15
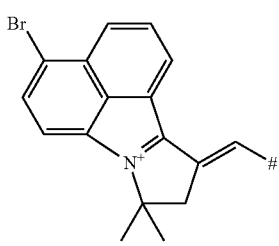
NA-16
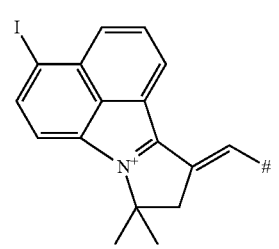

TABLE 1-continued
NA-17
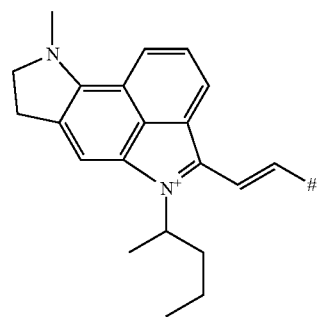
NA-18
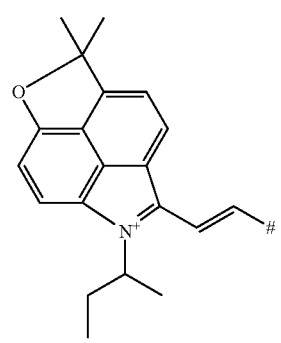
NA-19
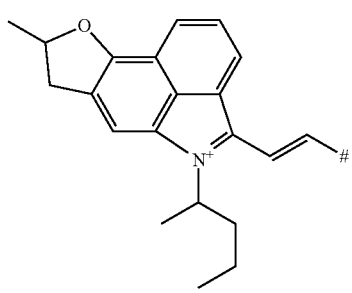
NA-20
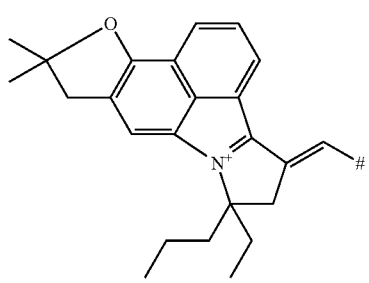
NA-21
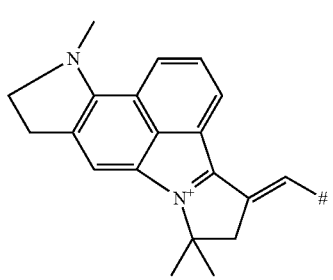
TABLE 1-continued
NA-22
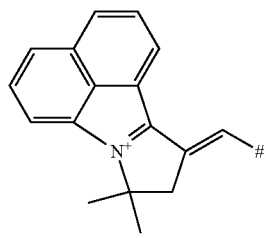
NA-23
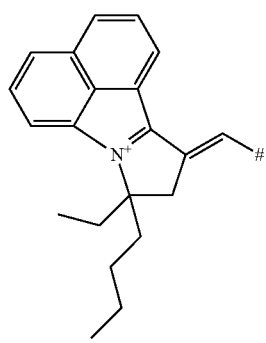
NA-24
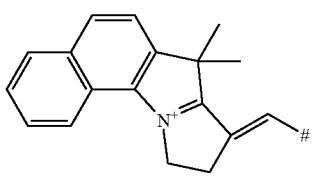
Preferred chain groups B are shown in Table 2 without being limited thereto.
TABLE 2
CB-1
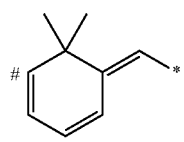 [SMILES: */C=C1\C=CC=CC1(C)C]
CB-2
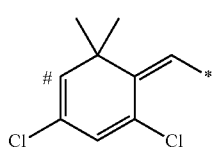 [SMILES: */C=C1\C(Cl)=CC(Cl)=CC1(C)C]
CB-3
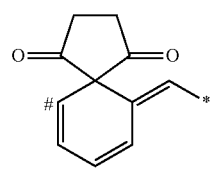 [SMILES: */C=C1\C=CC=CC12C(=O)CCC2=O]
CB-4
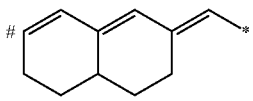

TABLE 2-continued

TABLE 2-continued
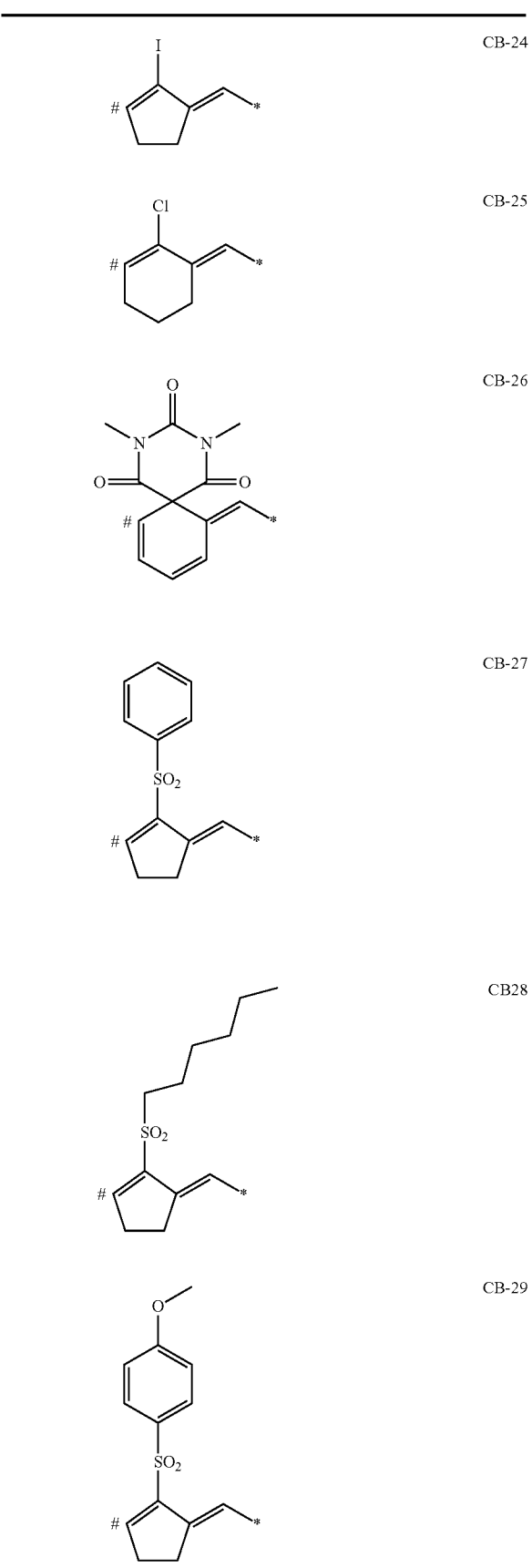
TABLE 2-continued
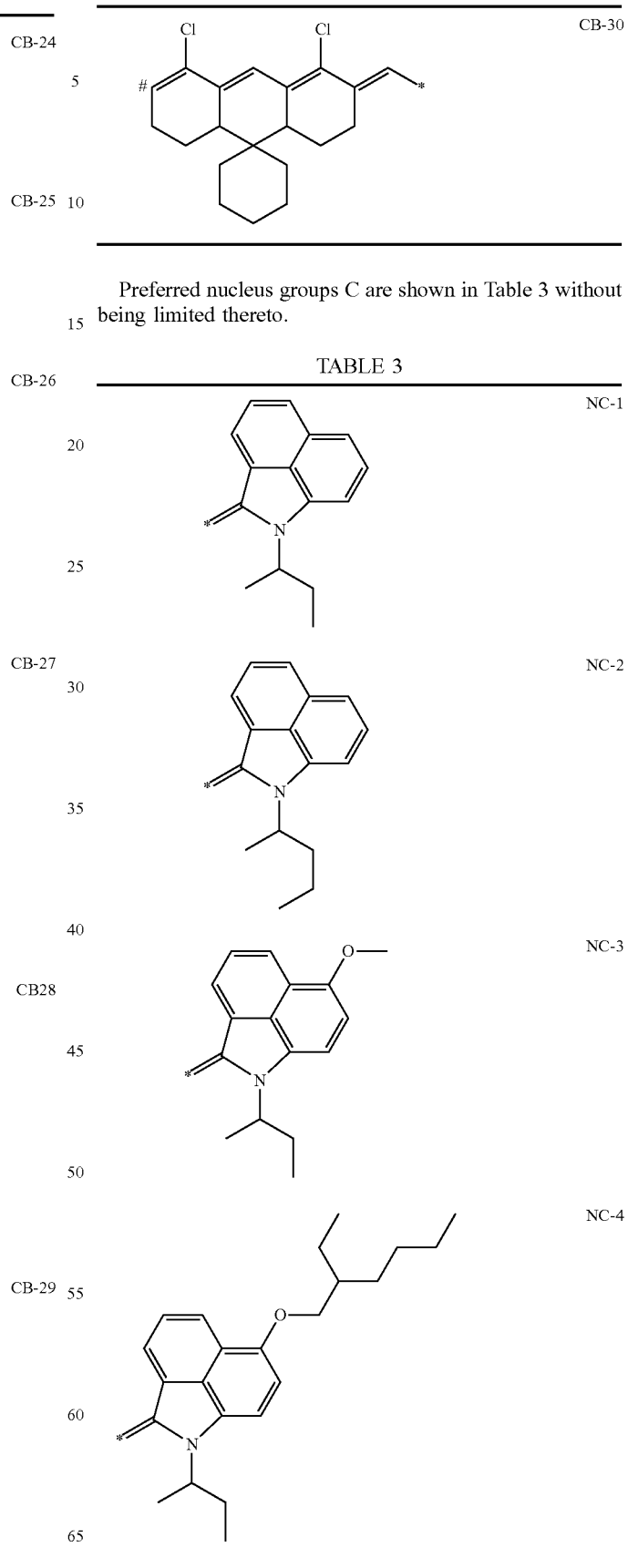
Preferred nucleus groups C are shown in Table 3 without being limited thereto.
TABLE 3

TABLE 3-continued
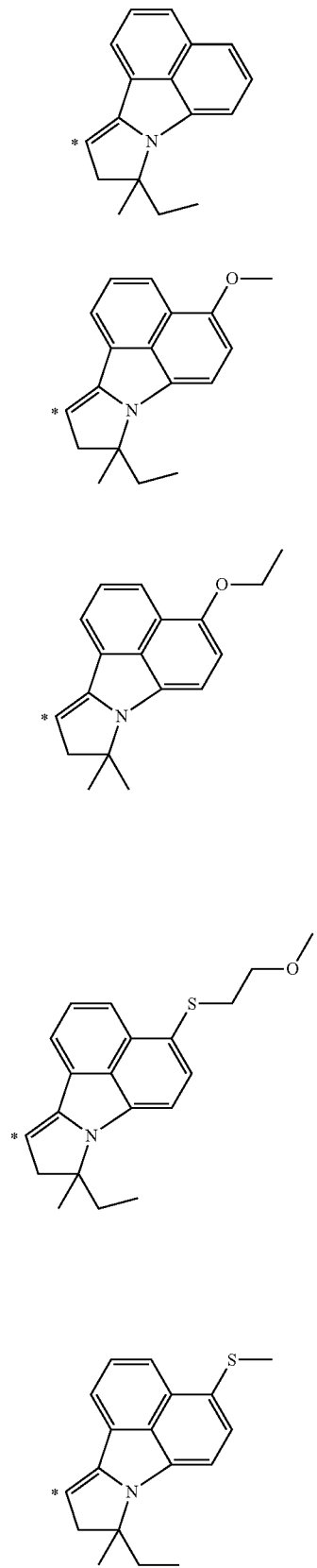
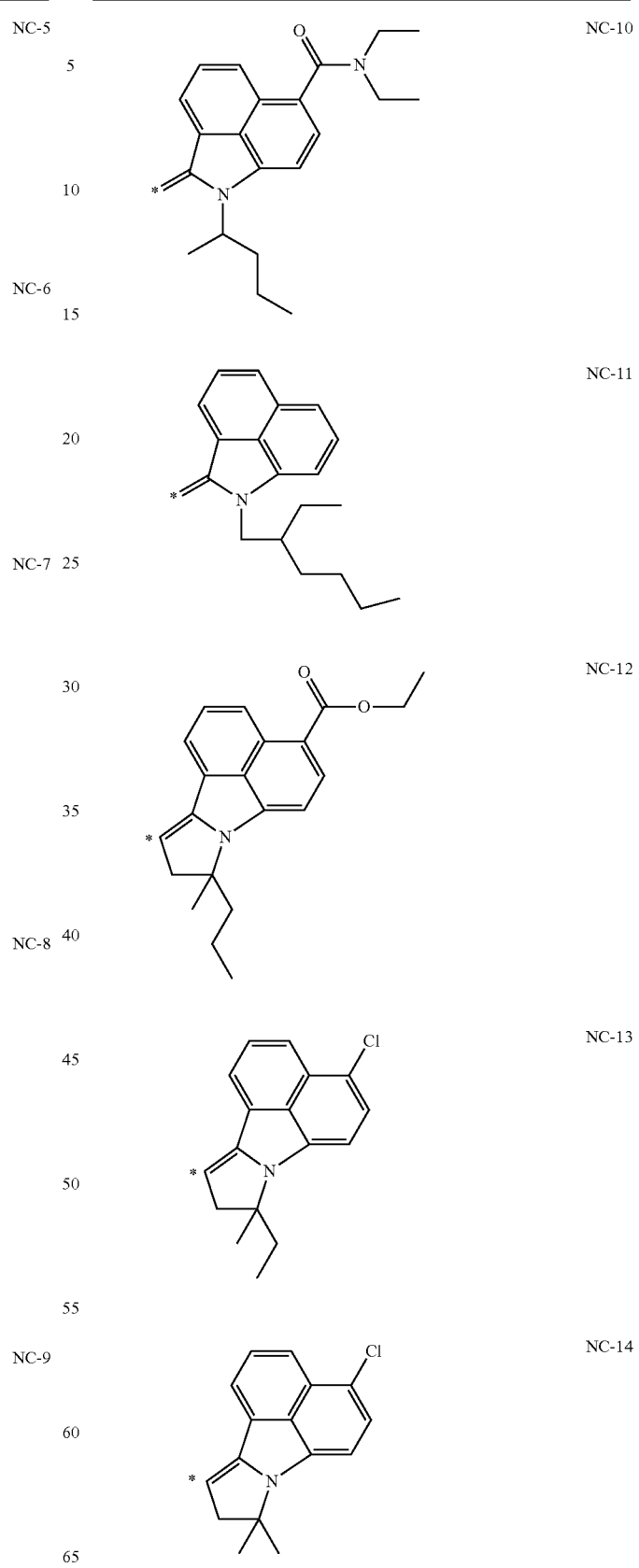

TABLE 3-continued

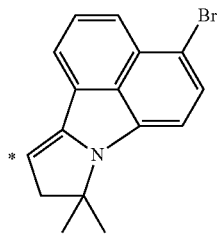 [SMILES: CC1(C)CC=c2c3cccc4c(Br)ccc(c43)n21]
NC-15

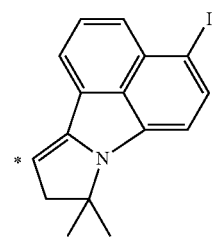 [SMILES: CC1(C)CC=c2c3cccc4c(I)ccc(c43)n21]
NC-16

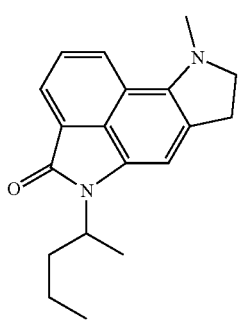 [SMILES: CCCC(C)N1C(=O)c2cccc3c4c(cc1c23)CCN4C]
NC-17

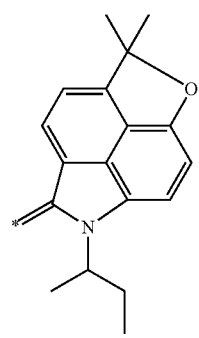
NC-18

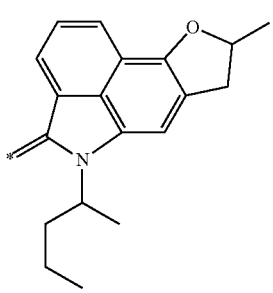
NC-19

TABLE 3-continued

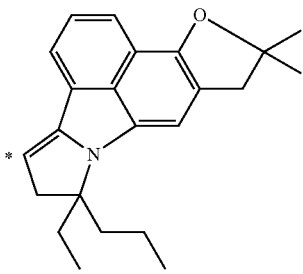 [SMILES: CCCC1(CC)CC=c2c3cccc4c5c(cc(c43)n21)CC(C)(C)O5]
NC-20

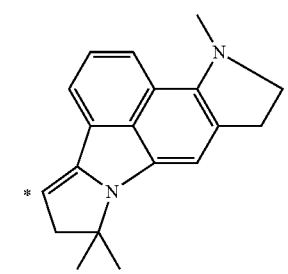 [SMILES: CN1CCc2cc3c4c(cccc4c4n3C(C)(C)CC=4)c21]
NC-21

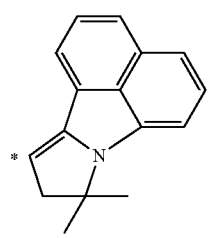 [SMILES: CC1(C)CC=c2c3cccc4cccc(c43)n21]
NC-22

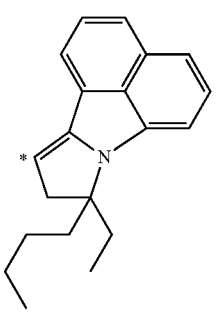 [SMILES: CCCCC1(CC)CC=c2c3cccc4cccc(c43)n21]
NC-23

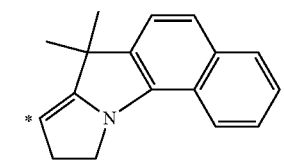 [SMILES: CC1(C)C2=CCCN2c2c1ccc1ccccc21]
NC-24

The synthesis of the infrared dye having a chemical structure A-B-C is well-known for a person skilled in the art of synthesizing dyes. For the sake of clarity, the method of synthesis is exemplified in Example 1 here below.

Infrared Dyes with $\lambda_{max}$(IR-2)

In a preferred embodiment of the color laser marked article, the infrared dye IR-2 is selected from the group consisting of quinoline dyes, indolenine dyes, especially a benzo[cd]indoline dye.

A particular preferred infrared dye is 5-[2,5-bis[2-[1-(1-methylbutyl)benz[cd]indol-2(1H)-ylidene]ethylidene]cyclopentylidene]-1-butyl-3-(2-methoxy-1-methylethyl)-2,4,6 (1H,3H,5H)-pyrimidinetrione (CASRN 223717-84-8), which has an absorption maximum $\lambda_{max}$ of 1052 nm making it very suitable for a Nd-YAG laser having an emission wavelength of 1064 nm.

Infrared Dyes with $\lambda_{max}$(IR-3)

In a preferred embodiment of the color laser marked article, the infrared dye IR-3 is selected from the group consisting of quinoline dyes, indolenine dyes, especially benzo[e]indolenine dyes, and benzo[f]indolenine dyes.

Polymeric Binders

The color laser markable layer includes a polymeric binder. There is no real limitation on the type of polymeric binder for so far it allows color formation.

For color laser marking, the laser markable layer preferably includes a polymeric binder comprising vinyl acetate and at least 85 wt % of vinyl chloride based on the total weight of the binder. Particularly preferred polymeric binders are disclosed in EP 2463110 A (AGFA).

The polymeric binder in the laser markable layer is preferably a copolymer including at least 85 wt % of a vinyl chloride and 1 wt % to 15 wt % of vinyl acetate, more preferably a copolymer including at least 90 wt % of a vinyl chloride and 1 wt % to 10 wt % of vinyl acetate with all wt % based on the total weight of the binder.

In a preferred embodiment, the polymeric binder includes at least 4 wt % of vinyl acetate based on the total weight of the binder. The advantage of having at least 4 wt % of vinyl acetate in the polymeric binder is that the solubility of the polymeric binder is drastically improved in preferred coating solvents, such as methyl ethyl ketone.

In a more preferred embodiment, the polymeric binder consists of vinyl chloride and vinyl acetate.

If the color laser marked article includes a laser markable layer for producing a black color through carbonization of the polymeric binder then the polymeric binder is preferably selected from polycarbonate (PC), polybutylene terephthalate (PBT), polyvinyl chloride (PVC), polystyrene (PS) and copolymers thereof, such as e.g. aromatic polyester-carbonate, styrene acrylonitrile and acrylonitrile butadiene styrene (ABS).

The polymeric binder is preferably present in the color laser markable layer in an amount of 3 to 30 g/m², more preferably in an amount of 5 to 20 g/m².

Leuco Dyes

A leuco dye is a compound which changes from essentially colorless to colored when heated, e.g. by laser marking. A number of classes of leuco dyes are preferred for the laser markable layer of the present invention, for example: azines such as oxazines, diazines and thiazines; triarylmethanes such as fluoresceins, rhodamines and rhodols; ketazines; barbituric acid leuco dyes and thiobarbituric acid leuco dyes.

The leuco dye is preferably present in the color laser markable layer in an amount of 0.5 to 5.0 g/m², more preferably in an amount of 1.0 to 3.0 g/m².

The following reaction mechanisms and leuco dyes are suitable to form a colored dye.

1. Fragmentation of a Leuco Dye

The reaction mechanism can be represented by:

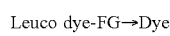

wherein FG represents a fragmenting group.

A preferred leuco dye (CASRN104434-37-9) is shown in EP 174054 A (POLAROID) which discloses a thermal imaging method for forming color images by the irreversible unimolecular fragmentation of one or more thermally unstable carbamate moieties of an organic compound to give a visually discernible color shift from colorless to colored.

The fragmentation of a leuco dye may be a two-step reaction mechanism represented by:

wherein FG represents a fragmenting group.

The fragmentation of a leuco dye may be catalyzed or amplified by acids and acid generating agents. The leuco dyes G-(1) to G-(17) disclosed by U.S. Pat. No. 6,100,009 (FUJI) are catalyzed or amplified by polymeric acid generating agents based on A-(1) to A-(52), which are also suitable as acid generating agents in the present invention.

2. Protonation of a Leuco Dye after Fragmentation of a H-Donor-Precursor

The reaction mechanism can be represented by:

Colored Dye wherein FG represents a fragmenting group.

A preferred H-donor-FG compound includes an ester group as part of its chemical structure (the rest of the compound is represented by the group T) which by laser heating forms a carboxylic acid group:

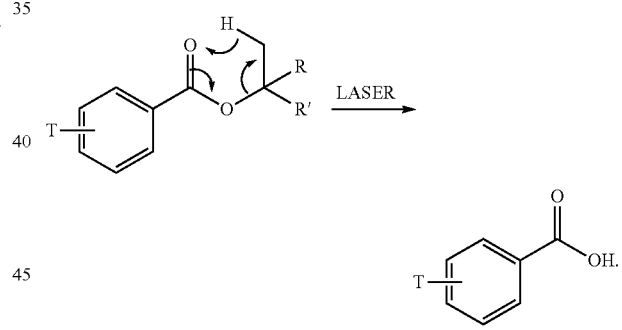

A more preferred H-donor-precursor includes a carbonate group, e.g. a tBOC group, as part of its chemical structure (the rest of the compound is represented by the group T) which by laser heating forms a phenol group:

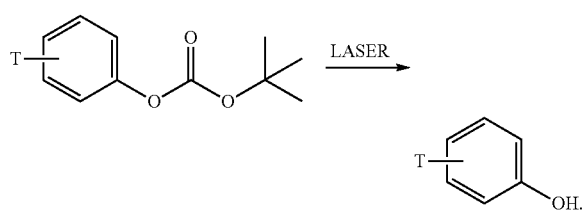

Preferred carbonate groups are given on page 8 of EP 605149 A (JUJO PAPER). In a preferred embodiment, the H-donor-FG compound contains 2 carbonate groups.

The most preferred H-donor-FG compound is:

HDP

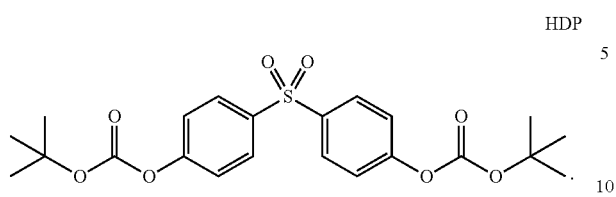

The synthesis of compound HDP (CASRN 129104-70-7) is given on page 31 of EP 605149 A (JUJO PAPER) for the compound (19).

In addition to the H-donor, the fragmentation of the H-donor-FG compound above also leads to the formation of a compound having a melting temperature lower than room temperature (20° C.) The formation of such a compound can be used as an additional security feature. After laser marking a laser markable article through a polymeric support, such as a biaxially stretched polyethylene terephthalate polymeric foil, the compound having a melting temperature lower than room temperature may disturb a second laser marking (falsification of a security document) by the formation of visible blisters.

3. Protonation of a Leuco Dye after a Re-Arrangement in a H-Donor-Precursor

The reaction mechanism can be represented by:

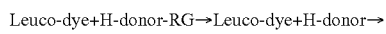

Colored Dye wherein RG represents a rearranging group.

A preferred H-donor-RG compound is capable of forming a compound having an allyl substituted phenol group as part of its chemical structure (the rest of the compound is represented by the group T) by laser heating:

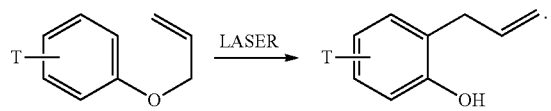

Preferred H-donor-RG compounds include 4,4'-diallyloxy diphenylsulfone whereof the synthesis is disclosed by EP 1452334 A (RICOH).

In contrast to the H-donor-FG compound of reaction mechanism 2, no compound having a melting temperature lower than room temperature (20° C.) is produced by the rearrangement of the H-donor-precursor to a hydrogen donor.

The color formation according to the mechanisms 2 and 3 above are two-component reactions involving a leuco dye and a hydrogen donor-precursor, i.e. a 'H-donor-FG compound' or 'H-donor-RG compound', while the first reaction mechanism is an one-component reaction. The advantage of using a two-component reaction for the color formation is that the stability, especially the shelf-life stability, can be enhanced. The probability of undesired color formation due to environment heating is decreased by going from a single step reaction to a two step reaction involving the formation of the H-donor followed by a reaction of the formed H-donor with the leuco dye.

The preferred color formation mechanism is the protonation of a leuco dye after fragmentation of the H-donor since it includes both advantages of the blister formation security feature and the enhanced shelf-life stability.

In a preferred embodiment of the laser markable layer, a combination is used of 4,4'-Bis(tert-butoxycarbonyloxy)diphenylsulfone (CASRN 129104-70-7) as the H-donor-FG compound with the leuco dye crystal violet lactone (CASRN 1552-42-7) for producing a blue color.

In a preferred embodiment of a laser markable layer for producing a cyan color, the cyan color forming compound has a structure according to Formula CCFC:

Formula CCFC

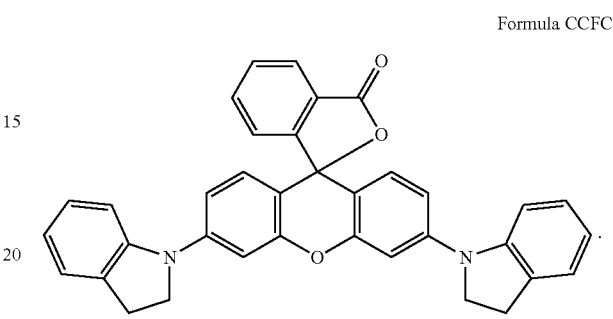

In a preferred embodiment of a laser markable layer for producing a magenta color, the magenta color forming compound has a structure according to Formula MCFC:

Formula MCFC

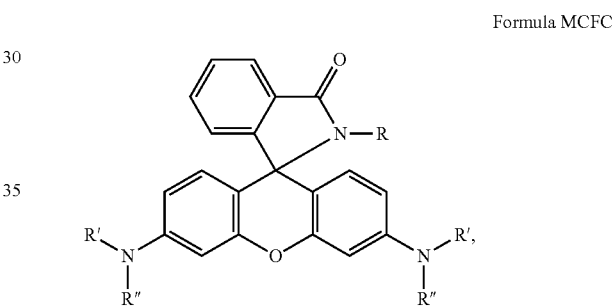

wherein R, R', R" are independently selected from the group consisting of hydrogen, a linear alkyl group, a branched alkyl group, an aryl and aralkyl group; or R' and R" are linked to form a heterocyclic ring.

In one embodiment, the magenta color forming compound has a structure according to Formula MCFC, the R, R', R" may independently represent a linear alkyl group, a branched alkyl group, an aryl or an aralkyl group substituted by at least one functional group containing an oxygen atom, a sulphur atom or a nitrogen atom.

Particularly preferred magenta color forming compounds include the compounds M-1 to M-6 of Table 4.

TABLE 4

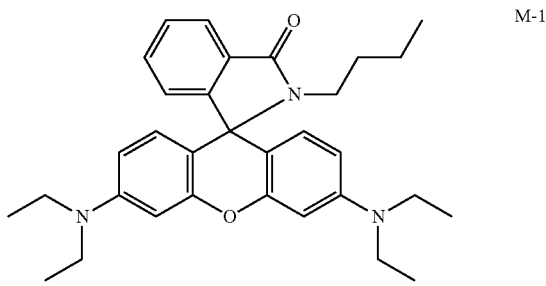

M-1

TABLE 4-continued

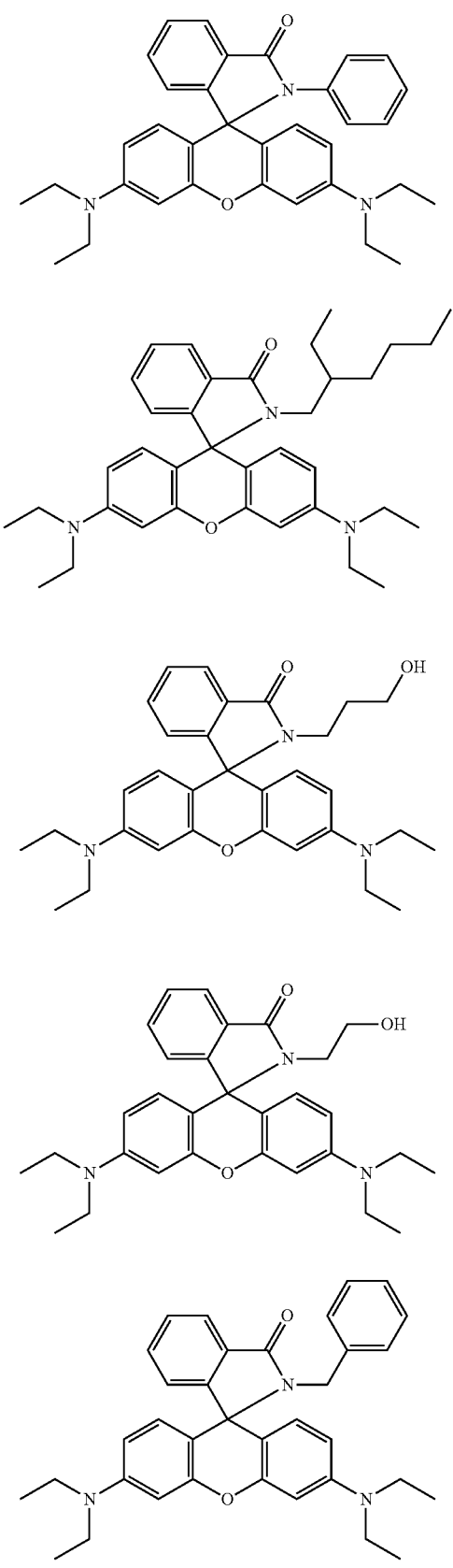

In a very preferred embodiment of a laser markable layer for producing a magenta color, the magenta color forming compound has a structure according to Formula MCFC2:

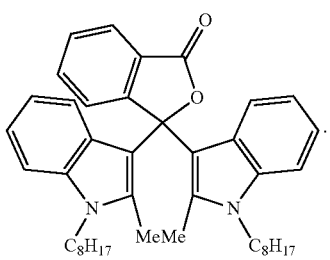

MCFC2

In a preferred embodiment of a laser markable layer for producing a red color, the red color forming compound has a structure according to Formula RCFC:

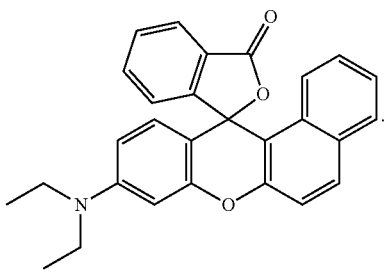

Formula RCFC

In a preferred embodiment of a laser markable layer for producing a yellow color, the yellow color forming compound has a structure according to Formula YCFC:

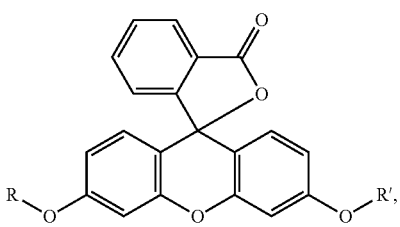

Formula YCFC wherein R, R' are independently selected from a group consisting of a linear alkyl group, a branched alkyl group, an aryl and aralkyl group.

In one embodiment, the yellow color forming compound has a structure according to Formula YCFC, wherein R and R' independently represent a linear alkyl group, a branched alkyl group, an aryl or an aralkyl group substituted by at least one functional group containing an oxygen atom, a sulphur atom or a nitrogen atom.

A particularly preferred yellow color forming compound is the compound according to Formula YCFC wherein both R and R' are methyl.

The leuco dye is preferably present in the laser markable layer in an amount of 0.01 to 2.0 g/m², more preferably in an amount of 0.1 to 1.0 g/m².

Thermal Acid Generating Compounds

The fragmentation of a leuco dye in a color laser markable layer according to a preferred embodiment of the present invention may be catalyzed or amplified by acids and acid generating agents.

Suitable thermal acid generating agents may be the polymeric acid generating agents based on the ethylenically unsaturated polymerizable compounds A-(1) to A-(52) disclosed by U.S. Pat. No. 6,100,009 (FUJI).

Suitable non-polymeric acid generating agents are, for example, the compounds E-(1) to E-(90) disclosed by U.S. Pat. No. 6,100,009 (FUJI) lacking the ethylenically unsaturated polymerizable group.

The thermal acid generating agent is preferably present in the amount of 1 to 20 wt %, more preferably 5 to 15 wt % based on the total dry weight of the laser markable layer.

Stabilizers

A color laser markable layer, preferably the outermost color laser markable layer containing the infrared dye IR-3, includes in a preferred embodiment according to the present invention at least one stabilizer, preferably a UV stabilizer.

Suitable commercially available stabilizers include 6-O-palmitoyl-L-ascorbic acid (CASRN137-66-6) from BASF; TOCOBLEND™ L70 IP (CASRN1406-66-2) from VITA-BLEND NEDERLAND BV; gallic acid ethyl ester (CASRN831-61-8) from ACROS; 3,6-dithia-1,8-octanediol (CASRN5244-34-8) from ALDRICH; Irganox™ 1035 (CASRN41484-35-9) from CIBA; ADK STAB PEP36 (CASRN80693-00-1) from PALMAROLE; calcium stearate; Tinuvin™ 292 (CASRN 41556-26-7), Tinuvin™ 400 (CASRN 192662-79-6), Tinuvin™ P (CASRN2440-22-4), Tinuvin™ 1130 (CASRN 104810-48-2) and Tinuvin™ 123 (CASRN 122586-52-1) from BASF; Irgastat™ P 18 (CASRN401844-75-5) from CIBA; 1-dibutylacetamido-mercaptotetrazole (CASRN168612-06-4) from Chemosyntha; 1-(3,4-dichlorophenyl)-1,2-dihydro-5H-tetrazole-5-thione (CASRN63684-99-1) from NOVASEP; CYASORB™ UV1164 (CASRN2725-22-6) from CYTEC INDUSTRIES BV; Tinuvin™ 400 (CASRN 192662-79-6); 2-(2,4-dihydroxyphenyl)-4,6-bis-(2,4-dimethylphenyl)-s-triazine (CASRN1668-53-7) from Capot Chemical Ltd; 4-[4,6-bis(2-methylphenoxy)-1,3,5-triazin-2-yl]-1,3-benzenediol (CASRN13413-61-1); Mixxim™ BB/100 (CASRN103597-45-1) from FAIRMOUNT; Hostavin™ 3225-2 DISP XP from CLARIANT; and other benzotriazole and benzophenone compounds.

Particularly preferred stabilizers include a phenol stabilizer sterically hindered by a ring containing three nitrogen atoms represented by Formula (Stabi-I):

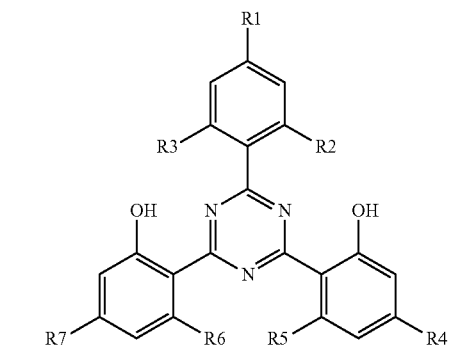

or Formula (Stabi-II):

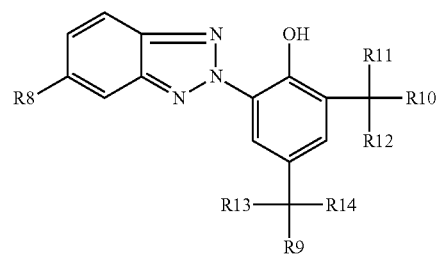

Wherein

R1 to R7 is each independently selected from the group consisting of hydrogen, an alkyl group containing 1 to 12 carbon atoms and an alkoxy group containing 1 to 12 carbon atoms;

R8 represents hydrogen or a halogen atom;

R9 and R10 is each independently selected from the group consisting of hydrogen, an alkyl group containing 1 to 6 carbon atoms and an aryl group containing 1 to 12 carbon atoms; and R11 to R14 is each independently selected from the group consisting of an alkyl group containing 1 to 6 carbon atoms.

In a preferred embodiment, R1 to R7 is each independently selected from the group consisting of hydrogen, an alkyl group containing 1 to 8 carbon atoms, more preferably an alkyl group containing 1 to 6 carbon atoms, and an alkoxy group containing 1 to 8 carbon atoms, more preferably an alkoxy group containing 1 to 6 carbon atoms.

In a preferred embodiment, R9 and R10 is each independently selected from the group consisting of hydrogen, an alkyl group containing 1 to 8 carbon atoms, more preferably an alkyl group containing 1 to 6 carbon atoms, and an aryl group containing 1 to 12 carbon atoms, more preferably an alkyl group containing 1 to 10 carbon atoms.

In a preferred embodiment, R5 and R6 both represent hydrogen.

In a preferred embodiment, R11 to R14 all represent methyl and preferably R9 and/or R10 represent methyl or phenyl.

In a preferred embodiment, R8 represents a chlorine atom.

In a preferred embodiment, R9 and/or R10 represent a phenyl substituted by an alkyl group or a napthyl group.

In a particularly preferred embodiment, the color laser markable laminate includes a phenol stabilizer sterically hindered by a ring containing three nitrogen atoms and is selected from the group consisting of IS-1 to IS-4 shown in Table 5.

TABLE 5

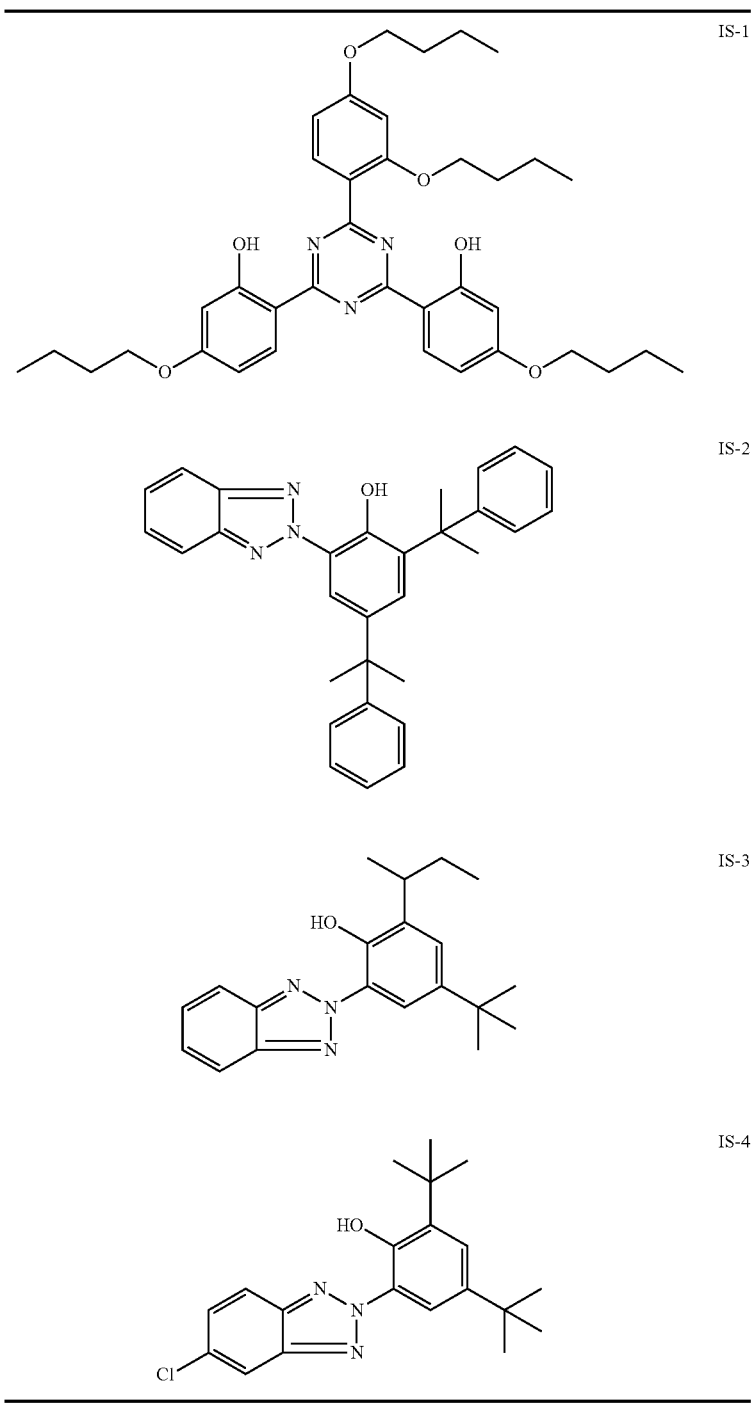

The stabilizer is preferably present in a laser markable layer, but may also be present in another layer, for example, an outer layer. An outer layer is a layer more distant from the opaque core support than the laser markable on the same side of the opaque core support.

Coating Solvents

For coating the laser markable layers, one or more organic solvents may be used. The use of an organic solvent facilitates the dissolution of the polymeric binder and specific ingredients such as the infrared dye.

A preferred organic solvent is methylethylketone (MEK) because it combines a high solubilizing power for a wide range of ingredients and it provides, on coating the color laser markable layer, a good compromise between the fast drying of the layer and the danger of fire or explosion thereby allowing high coating speeds.

Polymeric Supports

The color laser markable layers are coated on a support, preferably a polymeric support. If a polymeric support is located between the color laser markable layer and the infrared laser for laser marking it, then the polymeric support is transparent for the light of the infrared lasers in at least that area used for laser marking, preferably the support is a transparent polymeric support. The polymeric supports are also transparent for visual light so that the color formed in the color laser markable layers can be well observed.

The polymeric support for a laser markable layer is preferably a transparent (bi)axially stretched polymeric support, more preferably a transparent (bi)axially stretched polyester support, and most preferably a transparent (bi) axially stretched polyethylene terephthalate support.

The transparent polymeric support of the outer laminate is preferably selected from the group consisting of an axially stretched polyethylene terephthalate support, a biaxially stretched polyethylene terephthalate support, an axially stretched polyethylene naphthalate support and a biaxially stretched polyethylene naphthalate support.

In a very preferred embodiment of the set of laminates, at least the outer laminate includes a biaxially stretched polyethylene terephthalate support as transparent polymeric support.

The color laser markable layer may be coated directly on the polymeric support or on a subbing layer provided on the polymeric support for improving adhesion of the laser markable layer, thereby making falsification through delamination more difficult.

Suitable polymeric supports include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulphonamides.

In the most preferred embodiment, the transparent polymeric support is a biaxially stretched polyethylene terephthalate foil (PET-C foil) which is very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use. PVC (polyvinylchloride) is the most widely used material for plastic cards but has low durability of the card body, resulting in an effective lifetime of only 1-3 years, much lower than the lifetime of the often expensive electronic chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

The transparent polymeric support is preferably a single component extrudate, but may also be co-extrudate. Examples of suitable co-extrudates are PET/PETG and PET/PC (PC=polycarbonate).

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known to a person skilled in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Core Supports

The core support may be a transparent or translucent support, but is preferably an opaque core support, more preferably having a white or a pastel color, most preferably a white color, for allowing easily readable information and viewable color images. The advantage of an opaque white core support is also that a color image is more appealing since colors usually are more vibrant with a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In a preferred embodiment of the present invention the rutile type is preferred because it has a very high refractive index, exhibiting a high covering power.

Methods to obtain opaque polyethylene terephthalate and biaxially oriented films thereof have been disclosed in, e.g. US 2008238086 (AGFA).

Subbing Layers

The transparent polymeric supports and opaque core supports may be provided with one or more subbing layers. This has the advantage that the adhesion between the color laser markable layer and the support is improved.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA), GB 1441591 (AGFA) and EP 2374602 A (AGFA).

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m$^2$.

Additional Layers and Foils

The color laser marked article may include additional layers foils. Such an additional layer can, for example, be an adhesive layer, a layer including UV stabilizers for protecting color images against bleaching or a layer containing an infrared antihalation dye for improving the sharpness of a color image.

An adhesive foil may be interlaminated between two color laser markable layers in order to make falsification by delamination more difficult. Instead of an adhesive foil, an adhesive layer may be applied as a layer on top of a color laser markable layer. However, the use of an adhesive foil instead of an adhesive layer has the advantage is that an adhesive foil does not extract some of the more soluble ingredients in the laser markable layer like an adhesive layer can do upon coating and drying. Variation in the concentration of the soluble ingredients leads to inconsistencies in the color production during laser marking.

Suitable adhesive foils include pressure-sensitive and thermo-sensitive adhesive foils. A range of so-called hot melt foils are well-known to one skilled in the art of security films and security documents.

A preferred hot melt foil in the present invention is a polyurethane foil. Suitable commercially available hot melt foils include Platilon™ ID5051, a 35 μm polyurethane foil available from Epurex. Other suitable hot melt foils are Scapa™ Thermofoil G160 and G161.

Another preferred adhesive foil is PETG. Contrary to biaxially oriented polyethylene terephthalate, a non-oriented PETG foil softens rapidly near the glass transition temperature and can thus also be used for adhesive purposes.

In a preferred embodiment, the adhesive foil is made of a non-chlorinated polymer. Adhesive foils based on a chlorinated polymer may cause background discoloration. Preferred adhesive foils include polyester, polyester urethane, polyether urethane or polyolefin hot melt foils.

If the adhesive is applied as an adhesive layer on a color laser markable layer or on polymeric support, this may be performed by methods such as solvent coating, casting, or hot melt extrusion.

Suitable thermo adhesive compositions are disclosed in WO 2009/063058 (AGFA). Preferred thermo adhesive layers are based on a hydroxyl-functional, partially-hydrolyzed vinyl chloride/vinyl acetate resin such as, for example, available under the trade name of UCAR™ VAGD Solution vinyl resin from Dow Chemical Company.

The adhesive foil preferably has a thickness smaller than 65 μm, more preferably smaller than 50 μm and most preferably smaller than 40 μm.

Security Features

The color laser marked articles include preferably one or more security features to increase the difficulty for falsifying the document.

To prevent forgeries of e.g. identification documents, different means of securing may be used. One solution consists in superimposing lines or guilloches on an identification picture such as a photograph. Other solutions consist in adding security elements such as information printed with ink that reacts to ultraviolet radiation, micro-letters concealed in an image or text etc.

Suitable other security features such as anti-copy patterns; guilloches; line patterns; endless text; miniprint; microprint; nanoprint; rainbow coloring; barcodes including 2D-barcodes; colored fibres; fluorescent fibres and planchettes; fluorescent pigments including fluorescent hi-lites; OVD (Optically Variable Device) and DOVID (Diffractive Optically Variable Image Device) such as holograms, 2D and 3D holograms, holograms with kinematic effects like Kinegrams™; overprint; relief embossing; perforations; metallic pigments; magnetic material; metameric colors; microchips such as RFID chips; images made with OVI (Optically Variable Ink) such as iridescent and photochromic ink; images made with thermochromic ink; phosphorescent pigments and dyes; watermarks including single tone, duotone and multitone watermarks; ghost images and security threads.

EXAMPLES

Materials

All materials used in the following examples were readily available from standard sources such as Aldrich Chemical Co. (Belgium) and Acros (Belgium) unless otherwise specified. The water used was deionized water.

CCE is Bayhydrol H 2558, a anionic polyester urethane (37.3%) from BAYER.

Resorcinol from Sumitomo Chemicals.

Par is a dimethyltrimethylolamine formaldehyde resin from Cytec industries.

PAR-sol is a 40 wt % aqueous solution of Par.

PEA is Tospearl™ 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt %).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in isopropanol.

MEK is an abbreviation used for methylethylketone.

Solvin™ 557RB is a vinylchloride-vinylacetate copolymer with 11% vinyl acetate, provided by SOLVAY.

SolvinSol is a 12.5 wt % solution of Solvin™ 557RB in MEK.

Vinnol™ H40/55 is a copolymer of 62 wt % vinyl chloride and 38 wt % of vinyl acetate provided by Wacker AG.

VinnolSol is a 12.5 wt % solution of Vinnol™ H40/55 in MEK.

HDP is the hydrogen donor-precursor CASRN 129104-70-7 prepared according to the synthesis given on page 31 of EP 605149 A (JUJO PAPER) for the compound (19).

BLD is crystal violet lactone (CASRN 1552-42-7) available from YAMADA CHEMICAL CO.

MLD is a bisindolylphthalide leuco dye (CASRN50292-95-0) available as Pergascript™ Red 16B from BASF.

YLD is 3',6'-dimethoxyfluoran (CASRN36886-76-7) available from TCI Europe NV.

IR-1Asol is a 0.15 wt % solution in MEK of the infrared dye IR-1A.

IR-1Csol is a 0.15 wt % solution in MEK of the infrared dye IR-1C.

IR-2 is a 0.15 wt % solution in MEK of the infrared dye CASRN 223717-84-8 having an absorption maximum at 1052 nm and was prepared in the same manner as disclosed by paragraphs [0150] to [0159] of EP 2463109 A (AGFA).

IR-3 was synthesized as follows via the intermediates IR-INT1 and IR-INT2:

Synthesis of IR-Absorber IR-INT1

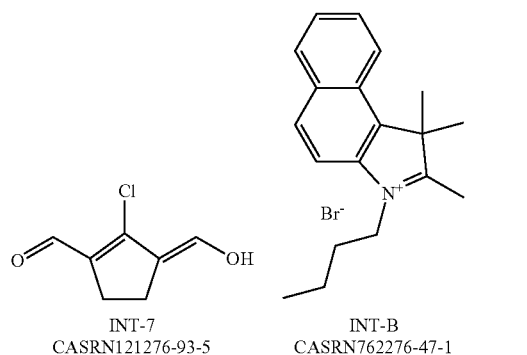

INT-7
CASRN121276-93-5

INT-B
CASRN762276-47-1

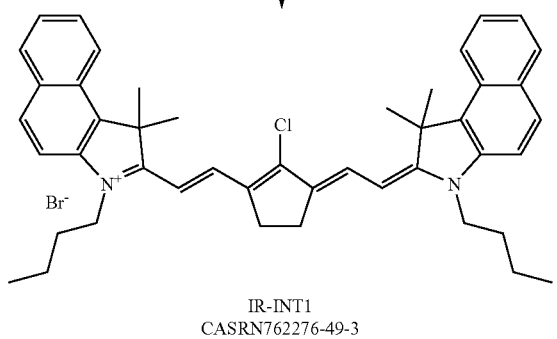

IR-INT1
CASRN762276-49-3

The synthesis of the intermediate INT-7 was performed as disclosed for infrared dye IR-1B.

The synthesis of the intermediate INT-B was performed as follows. 1 mol of 1,1,2-trimethyl-1H-benzo[e]indole (CASRN41532-84-7) and 2 mol of n-butyl bromide were stirred in 0.5 l sulfolane for four hours at 100° C. INT-B was filtered, washed with ethyl acetate and dried. The yield was 61%.

To a stirred mixture of INT-7 (4.75 g; 30 mmol) and INT-B (20.8 g; 60 mmol) in ethanol (100 mL) at room temperature were added consecutively triethylamine (12.1 g; 120 mmol) and acetic acid anhydride (12.2 g; 120 mmol). After heating to 50° C. for 1 hour, the reaction mixture was cooled to 20° C. and isopropanol (100 mL) was added. After 1 hour the precipitated IR-absorber was isolated by filtration, washed with EtOAc (20 mL) and dried in vacuo. Yield (crude) of IR-INT1 was 16 g (73%).

The absorption maximum of IR-INT1 measured in methanol was 844 nm.

Synthesis of IR-Absorber IR-INT2

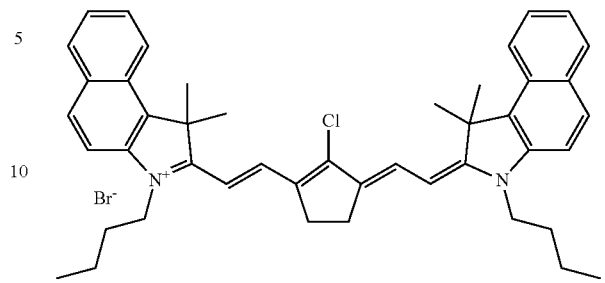

IR-INT1
CASRN762276-49-3

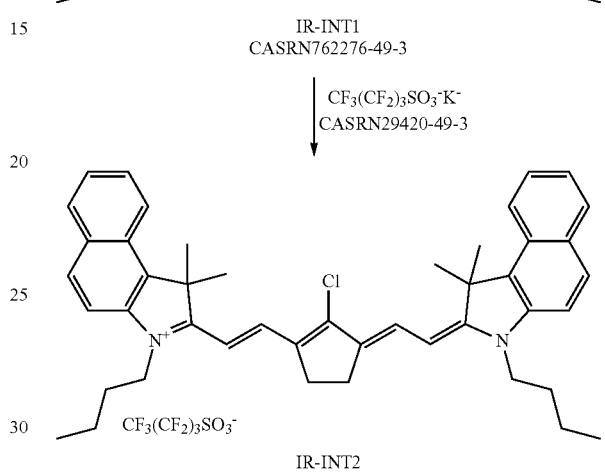

IR-INT2

To a stirred suspension of IR-INT1 (16 g; 22 mmol) in acetonitrile (200 mL) was added potassium nonafluorobutanesulfonate (CASRN29420-49-3 from TCI Europe N.V.; 8.1 g; 24 mmol) and this mixture was heated at 70° C. for 15 minutes. After cooling to room temperature, water (100 mL) was drop wise added and after stirring for 2 hours the precipitated IR-absorber was isolated by filtration, washed consecutively with a mixture of acetonitrile/water 2/1 (20 mL), methyl tert. butylether (MTBE) (20 mL) and dried in vacuo. The yield of IR-INT2 was 14 g (67%). The absorption maximum of IR-INT2 measured in methanol was 844 nm.

Synthesis of Infrared Dye IR-3

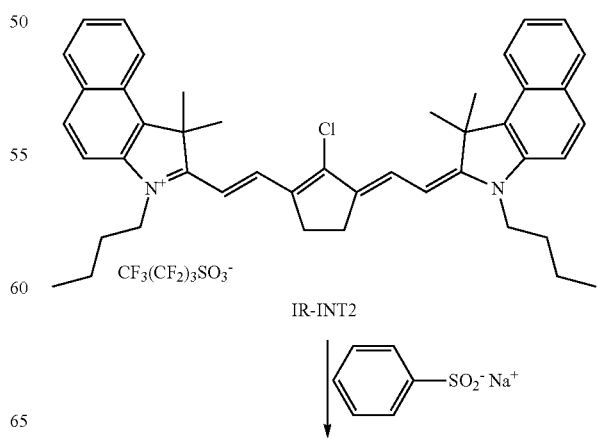

IR-INT2

-continued

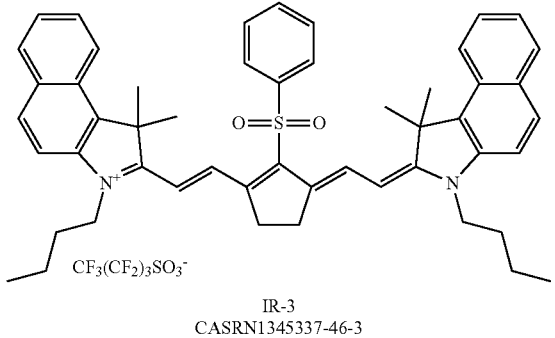

IR-3
CASRN1345337-46-3

To a stirred suspension of IR-INT2 (1.65 g; 1.73 mmol) in methanol (15 mL) under nitrogen at room temperature is added sodium benzenesulfinate (CASRN873-55-2 from Aldrich; 0.297 g; 1.81 mmol). After stirring for 2 hours the precipitated IR-absorber was isolated by filtration, washed with MTBE (5 mL) and dried in vacuo. The yield of IR-3 was 1.2 g (65%). The absorption maximum measured in methanol was 910 nm. The absorption maximum of IR-3 measured in $CH_2Cl_2$ including $6.5\times10^{-6}$ wt % of methanesulfonic acid was 923 nm.

IR-3sol is a 0.15 wt % solution in MEK of the infrared dye IR-3.

CORE is a 500 μm opaque PETG core available as PET-G 500 type 9311 from WOLFEN.

PETG TR is a 35 μm thick transparent PETG support available as type-PET-G transparent 35 μm from AMCOR.

Measurement Methods

1. Optical Density

The optical density was measured in reflection using a spectrodensitometer Type Macbeth TR924 using a visual filter.

2. Absorption Maximum at $\lambda_{max}(IR)$ and $\lambda_{max}(VIS)$ of Infrared Dyes The absorption maxima can be easily determined by absorption spectroscopy using a standard spectrophotometer capable of measuring the absorption between 300 and 1500 nm. Here a SHIMADZU UV-2101 PC spectrophotometer was used to measure the absorption maxima of an infrared dye dissolved in methylene chloride including $6.5\times10^{-6}$ wt % of methanesulfonic acid based on the total weight of methylenechloride. No methanesulfonic acid was used if the absorption spectrum was recorded in methanol or a solvent mixture therewith. The concentration of the infrared dye was adjusted according to the specific absorption characteristics of a dye so that an accurate measurement by the spectrophotometer was possible and not out of scale.

$\lambda_{max}(IR)$ is the wavelength of the absorption maximum in the infrared spectrum from 700 to 1500 nm.

$\lambda_{max}(VIS)$ is the wavelength of the absorption maximum in the visual spectrum from 400 to 700 nm.

For coated laser markable layers, the absorption between 250 nm tot 1500 nm was measured in steps of 10 nm using a PerkinElmer LAMBDA 950 UV/Vis/NIR Spectrophotometer.

3. IR/VIS

The ratio IR/VIS is determined by dividing the absorption at $\lambda_{max}(IR)$ by the absorption at $\lambda_{max}(VIS)$. For acceptable background discoloration the ratio IR/VIS should preferably be at least 3.5 and more preferably at least 7.0.

4. $D_{min}$ Increase

A $D_{min}$-area is an area which was not laser marked, i.e. a background density area. The difference in optical density between a $D_{min}$ area before and after an at least partial exposure of the method for preparing a color laser marked article is used as a criterion for evaluation of the increase in $D_{min}$ as shown in Table 6.

TABLE 6

| $D_{min}$ increase | Criterion |
| --- | --- |
| Minimal | Increase in optical density of 0.00 up to 0.20 |
| Moderate | Increase in optical density of more than 0.20 up to 0.40 |
| Strong | Increase in optical density of more than 0.40 up to 0.60 |
| Very strong | Increase in optical density of more than 0.60 |

5. % Inactivation

The % inactivation of the infrared dye is determined using the maximum optical densities ($D_{max}$) before and after an at least partial exposure of the method for preparing a color laser marked article. The % Inactivation is calculated according to the mathematical formula:

$$\% \text{ Inactivation} = \frac{D\max(BeforeExposure) - D\max(AfterExposure)}{D\max(BeforeExposure)} \times 100\%$$

The criteria used for evaluation are shown in Table 7.

TABLE 7

| % Inactivation | Criterion |
| --- | --- |
| Minimal | 0 to <5% |
| Moderate | 5 to <20% |
| Strong | 20% to 40% |
| Very strong | >40% |

Example 1

This example illustrates the synthesis of novel infrared dyes IR-1 for facilitating the method for preparing a color laser marked article in accordance with a preferred embodiment of the present invention.

Synthesis of Infrared Dye IR-1A

The synthesis of IR-absorber IR-1 was carried out as described below by preparing firstly the intermediates INT-1 to INT-6.

Synthesis of Intermediate INT-1

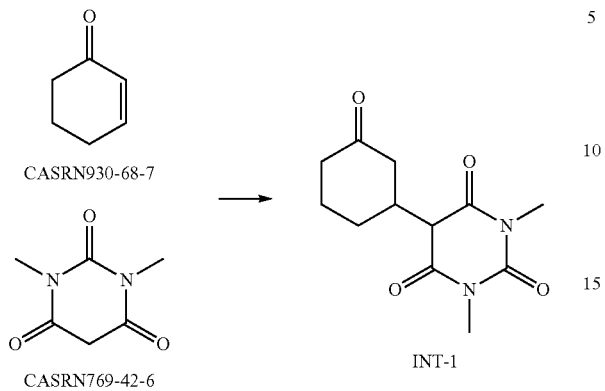

The starting materials cyclohexenone (CASRN930-68-7) and N,N-dimethyl barbituric acid (CASRN769-42-6) were commercially available compounds from TCI EUROPE N.V and Aldrich.

A mixture of cyclohexenone (48 g; 0.5 mol) and N,N-dimethyl barbituric acid (85.8 g; 0.55 mol) in water (0.5 L) was vigorously stirred at room temperature overnight. The white precipitate was filtered, digested with water (1.0 L) and dried in vacuo at 50° C. Yield of INT-1 (white powder): 111 g (88%).

Synthesis of Intermediate INT-2

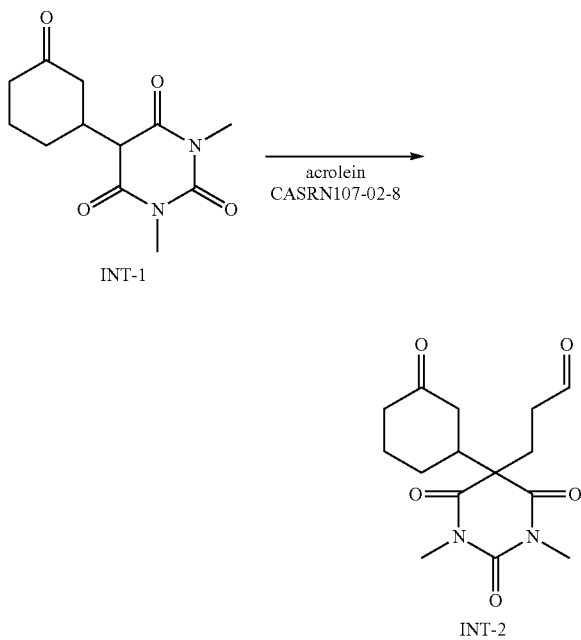

A mixture of INT-1 (37.8 g; 0.15 mol) and acrolein (containing 10% water and 0.1% hydroquinone) (14.0 g; 0.22 mol) in water (90 mL) and tetrahydrofuran (THF) (30 mL) was vigorously stirred at room temperature overnight. After addition of water (100 mL), stirring was continued for 1 hour. The white precipitate was filtered, digested with water (350 mL), filtered and dissolved in $CH_2Cl_2$ (200 mL). After washing the $CH_2Cl_2$ layer with water (30 mL) and drying over $MgSO_4$ (5 g), the $CH_2Cl_2$ layer was concentrated in vacuo (rotavap). Yield of INT-2 (sticky white powder): 38 g (82%).

Synthesis of Intermediate INT-3

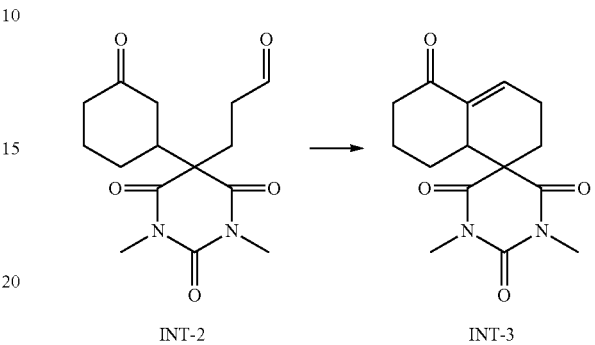

To a stirred solution of INT-2 (37 g; 0.12 mol) in $CH_2Cl_2$ (550 mL) was added a solution of methanesulfonic acid (5.76 g) in tetrahydrofuran (THF) (120 mL) at room temperature. After stirring for 24 hours, the mixture was consecutively extracted with a solution of $NaHCO_3$ (20 g) in water (200 mL), a solution of $NaHCO_3$ (7 g) in water (200 mL) and a solution of NaCl (10 g) in water (200 mL). After drying over $Mg_2SO_4$ (5 g), the organic layer was concentrated in vacuo (rotavap). Yield of INT-3 (sticky white powder): 30 g (85%).

Synthesis of Intermediates INT-4 (In-Situ) and INT-5 and INT-5'

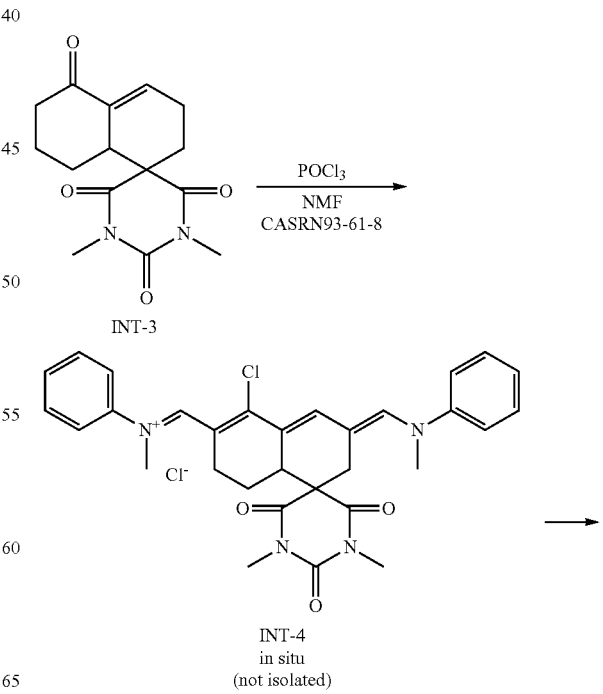

-continued

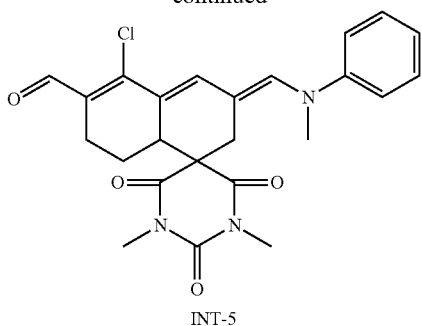

INT-5

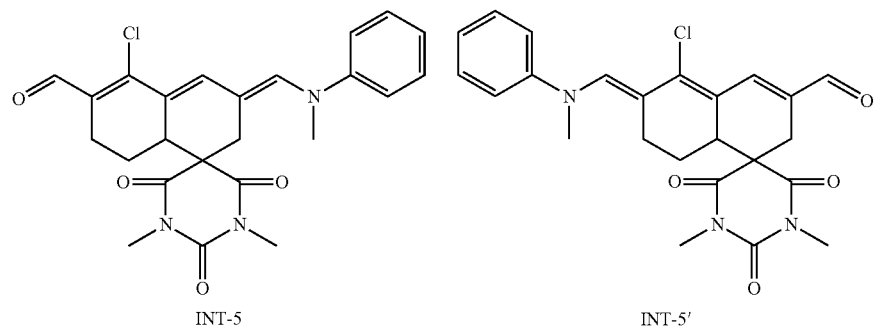

INT-5'

To a stirred solution of NMF (4.06 g; 0.03 mol) in methylacetate (40 mL) was added POCl₃ (6.9 g; 0.045 mmol) at 0° C. After stirring for 15 minutes, INT-3 (4.1 g; 0.014 mol) was added in small portions over a 15 minute period and then this mixture was heated to reflux (bath temperature 90° C.) for 2 hours. After cooling on an ice bath, the blue colored solution (containing INT-4) was poured into a cooled, well stirred solution of NaHCO₃ 0.3 aq (30.5 g) in water (50 mL). After gradual warming the mixture to room temperature over a 1 hour period, the organic phase was separated, washed with saturated NaCl in water (10 mL), dried over Mg₂SO₄ (5 g) and concentrated (viscous dark oil, ca. 10 g). After redissolving this oil in a mixture of acetic acid (42 mL) and methanol (142 mL), water (210 mL) was added while vigorously stirring. The formed red-brown precipitate was collected by filtration, digested with water (50 mL), filtered and dried in vacuo in the presence of solid KOH. Yield of red-brown powder: 2.59 g (41%). The absorption maximum (in methanol) was found to be 443 nm.

According to LC-MS analysis, the product was mainly a mixture of 2 isomers (ratio: +/−15:1) of INT-5 and INT-5' (or vice versa). Since this is inconsequential for the synthesis of IR-1A, the mixture was used directly in the next step.

Synthesis of Intermediate INT-6 and IR-1A

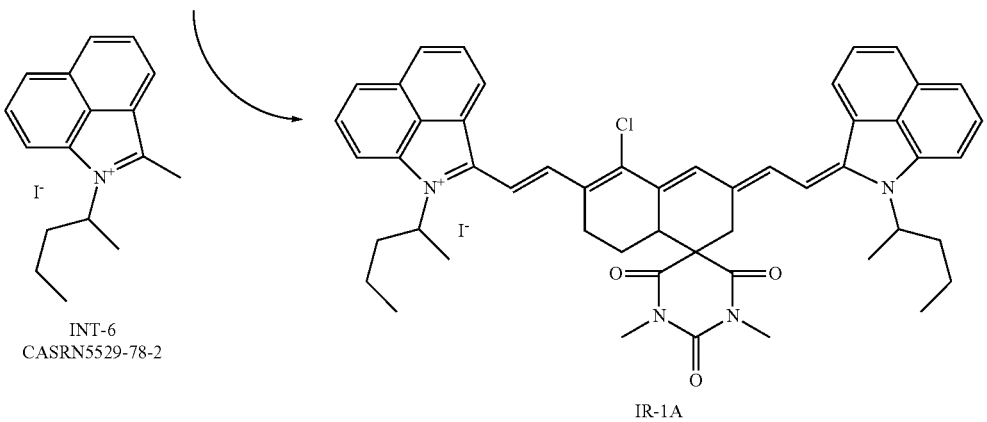

INT-6
CASRN5529-78-2

IR-1A

The synthesis of intermediate INT-6 was performed as disclosed in [0157] of EP 2463109 A (AGFA).

A suspension of INT-5/INT-5' (2.27 g; 5 mmol) and INT-6 (3.65 g; 10 mmol) was stirred overnight at room temperature in a mixture of methanol (25 mL) and CH$_2$Cl$_2$ (25 mL). The green-brown solids were isolated by filtration, digested in methanol (25 mL) for 15 minutes at room temperature, filtered and dried in vacuo. Yield of IR-1A (green-brown powder): 0.57 g (22%).

The absorption maximum of IR-1A measured in methanol was found to be 1132 nm. The absorption maximum of IR-1A measured in CH$_2$Cl$_2$ including 6.5×10$^{-6}$ wt % of methanesulfonic acid was 1154 nm.

Synthesis of Infrared Dye IR-1B

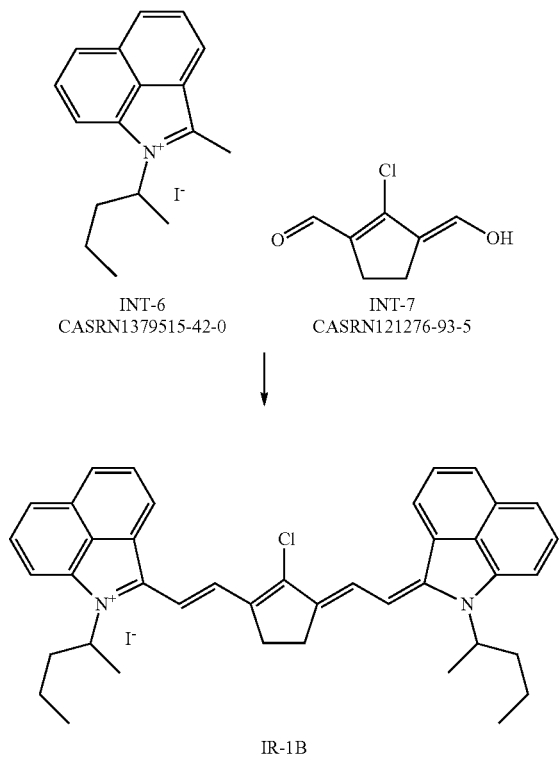

The intermediate INT-6 was prepared in the same manner as above for infrared dye IR-1A.

The synthesis of intermediate INT-7 was performed as follows. 10 mol of dimethylformamide and 3 mol phosphoryl chloride were heated up to 65° C. Then 1 mol of cyclopentanon was dropped to this mixture. After one hour of stirring at 60° C., the reaction mixture was poured into 2 l water containing 7 mol sodium acetate. INT-7 was filtered and dried. The yield was 60%.

To a stirred mixture of INT-7 containing 23% water (10.3 g; 0.05 mol) and INT-6 (36.5 g; 0.1 mol) in methanol (250 mL) was added a mixture of acetic acid (10.1 g; 0.1 mol) and triethylamine (18 g; 0.3 mol) over a 1 hour period. Stirring (under nitrogen) was continued for 1 hour at room temperature. The black precipitate was filtered and digested consecutively with 2×20 mL of methanol and 2×50 mL of methyl tertiary butylether (MTBE) and dried in vacuo. Yield of IR-1B (black powder): 27 g (74.6%).

The absorption maximum measured in methanol was 1040 nm. The absorption maximum of IR-1B measured in CH$_2$Cl$_2$ including 6.5×10$^{-6}$ wt % of methanesulfonic acid was 1062 nm. This infrared dye IR-1B is excluded from the scope of the present invention.

Synthesis of Infrared Dye IR-1C

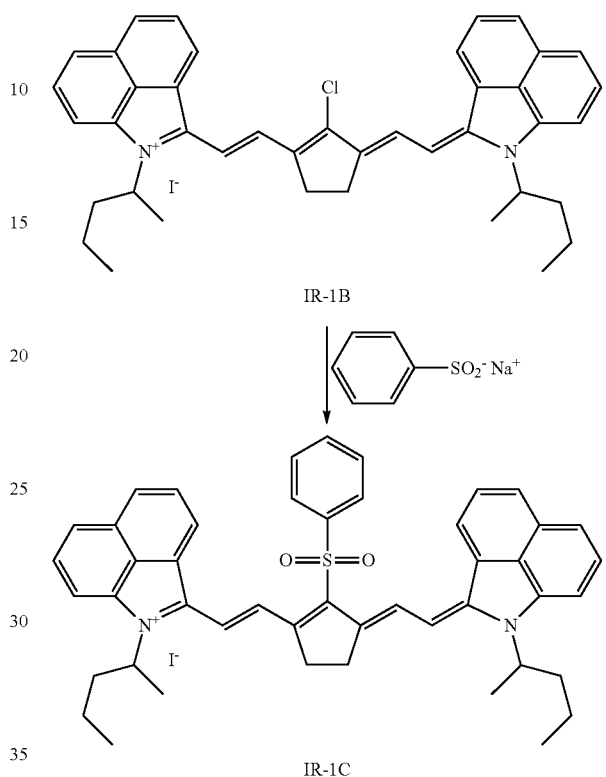

To a stirred suspension of IR-1B (500 mg; 0.69 mmol) in a mixture of ethanol (9 mL) and water (1 mL) at room temperature was added sodium benzenesulfonate (CASRN873-55-2; 135 mg; 0.82 mmol). After stirring for 15 minutes, the black precipitate was filtered, digested with a mixture of ethanol (4.5 mL) and water (0.5 mL) and dried in vacuo. The yield of IR-1C (black powder) was 467 mg (81%).

The absorption maximum measured in methanol was 1104 nm. The absorption maximum of IR-1C measured in CH$_2$Cl$_2$ including 6.5×10$^{-6}$ wt % of methanesulfonic acid was 1120 nm.

Synthesis of Infrared Dye IR-1D

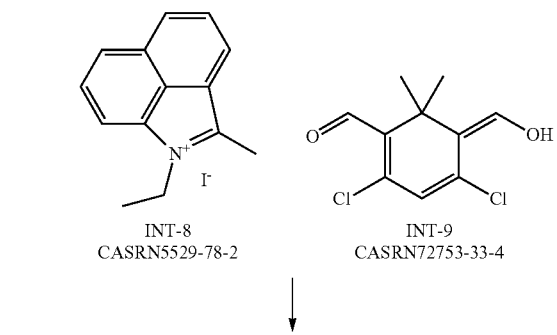

-continued

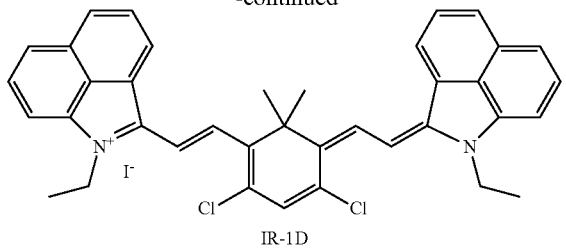

IR-1D

The synthesis of INT-8 was performed as in Sarmistha Halder Sinha, et al., European Journal of Medicinal Chemistry 54 (2012) 647-659.

The synthesis of INT-9 from dimedone was performed as described in Manfred Pulst, Bernd Hollborn, Manfred Weissenfels Journal f. prakt. Chemie, Band 321, Heft 4, 1979, S. 671-674

To a stirred suspension of INT-8 (81 mg; 0.25 mmol) and INT-9 (23 mg; 0.1 mmol) in a mixture of methanol (1 mL) and $CH_2Cl_2$ (1 mL) were added acetic acid (60 mg; 1.0 mmol) and indoline (25 mg; 0.2 mmol) at room temperature. After stirring over night, the precipitated IR-1D was filtered, digested consecutively with methanol (1 mL), a mixture of methanol (0.8 mL) and $CH_2Cl_2$ (0.2 mL) and dried in vacuo. The yield of IR-1D (black powder) was 10 mg (14%)

The absorption maximum measured in 1:1 mixture methanol/$CH_2Cl_2$ was found to be 1189 nm.

Example 2

This example illustrates the manufacturing and use of a set of color laser markable laminates for preparing a color laser marked article in accordance with the invention.

Preparation of PET-C foils PET1 and PET2

A coating composition SUB-1 was prepared by mixing the components according to Table 8 using a dissolver.

TABLE 8

| wt % of components | SUB-1 |
|---|---|
| deionized water | 76.66 |
| CCE | 18.45 |
| Resorcinol | 0.98 |
| PAR-sol | 0.57 |
| PEA-sol | 0.68 |
| DOW-sol | 1.33 |
| Surfynsol | 1.33 |

A 1100 μm thick polyethylene terephthalate sheet was first longitudinally stretched and then coated on one side with the coating composition SUB-1 to a wet thickness of 10 μm. After drying, the longitudinally stretched and coated polyethylene terephthalate sheet was transversally stretched to produce a single side subbed 63 μm thick sheet PET1, which was transparent and glossy.

A 1100 μm thick polyethylene terephthalate sheet was first longitudinally stretched and then coated on both sides with the coating composition SUB-1 to a wet thickness of 10 μm. After drying, the longitudinally stretched and coated polyethylene terephthalate sheet was transversally stretched to produce a double side subbed 63 μm thick sheet PET2, which was transparent and glossy.

Preparation of Color Laser Markable Inner Laminate IL1

The coating compositions BCOL1 and YCOL1 were prepared in the same way by mixing the components according to Table 9 using a dissolver.

TABLE 9

| wt % of components | BCOL1 | YCOL1 |
|---|---|---|
| MEK | 16.88 | 4.11 |
| SolvinSol | 60.00 | — |
| VinSol | — | 75.00 |
| IR-2 | 20.00 | — |
| IR-1Asol | — | 18.22 |
| HDP | 1.63 | 1.63 |
| BLD | 1.50 | — |
| YLD | — | 1.04 |

The coating composition BCOL1 was coated with an Elcometer Bird Film Applicator (from ELCOMETER INSTRUMENTS) on one side of the PET-C support PET2 at a coating thickness of 100 μm and subsequently dried for 2 minutes at 20° C. on the film applicator and for a further 15 minutes in an oven at 75° C.

Then the coating composition YCOL1 was coated with an Elcometer Bird Film Applicator (from ELCOMETER INSTRUMENTS) on the opposite side of the PET-C support PET2 coated with BCOL1 at a coating thickness of 100 μm and subsequently dried for 2 minutes at 20° C. on the film applicator and for a further 15 minutes in an oven at 75° C. to deliver the color laser markable inner laminate IL1.

Preparation of Color Laser Markable Outer Laminate OL1

The coating composition MCOL1 was prepared by mixing the components according to Table 10 using a dissolver.

TABLE 10

| wt % of components | MCOL1 |
|---|---|
| MEK | 0.07 |
| SolvinSol | 53.65 |
| IR-3sol | 40.7 |
| HDP | 2.13 |
| MLD | 3.45 |

The coating composition MCOL1 was coated with an Elcometer Bird Film Applicator (from ELCOMETER INSTRUMENTS) on the subbed side of the PET-C support PET1 at a coating thickness of 100 μm and subsequently dried for 2 minutes at 20° C. on the film applicator and for a further 15 minutes in an oven at 75° C. to deliver the color laser markable outer laminate OL1.

Preparation of Color Laser Markable Article LMA1

An assembly was made of, in order, a white opaque core support CORE, the color laser markable inner laminate IL1, a 35 μm PETG TR foil, and the color laser markable outer laminate OL1, wherein the side coated with YCOL1 of the color laser markable inner laminate IL1 faces the white opaque core support CORE and wherein the side coated with MCOL1 of the color laser markable outer laminate OL1 faces the 35 μm PETG TR foil.

The assembly was then laminated into a color laser markable article LMA1 using an Oasys™ OLA6/7 plate laminator with the settings: LPT=130° C., LP=40, Hold=210 sec, HPT=130° C., HP=40 and ECT=50° C.

Evaluation and Results

The laser markable article LMA1 was then laser marked with three infrared lasers of different emission wavelength.

A first optically pumped semiconductor laser emitting at 920 nm (Genesis MX 920-4000 MTM from COHERENT) was used for producing a magenta colored wedge of 1 cm×1 cm square boxes of increasing optical density up to a maximum optical density of 1.02 in the laser markable layer coated from MCOL1. The laser was used at a power level of 4.5 W (29.5 A), a dither of 0.025, a scan speed of 100 mm/s and at a pulse repetition rate of 1.2 kHz. The effective power was 70 to 90 mW.

A second optically pumped semiconductor laser emitting at 1064 nm (Genesis MX 1064-10000 MTM from COHERENT) was used for producing a blue colored wedge of 1 cm×1 cm square boxes of increasing optical density up to a maximum optical density of 1.38 in the laser markable layer coated from BCOL1. The laser was used at a power level of 4.0 W (21.8 A), a dither of 0.025, a scan speed of 100 mm/s and at a pulse repetition rate of 1.2 kHz. The effective power was 60 to 85 mW.

A third optically pumped semiconductor laser emitting at 1154 nm (Genesis MX 1154-6000 MTM from COHERENT) was used for producing a yellow colored wedge of 1 cm×1 cm square boxes of increasing optical density up to a maximum optical density of 0.55 in the laser markable layer coated from YCOL1. The laser was used at a power level of 2.25 W (19.4 A), a dither of 0.025, a scan speed of 100 mm/s and at a pulse repetition rate of 1.2 kHz. The effective power was 25 to 40 mW.

No color contamination was observed in the different colored wedges. This means that none of the three lasers caused any color formation in a laser markable layer other than the one for which it was intended. For example, the 920 nm laser caused no blue respectively yellow color formation in the laser markable layers coated from BCOL1 and YCOL1.

The color laser marked articles were then exposed to Xenon light at 765 W/m$^2$ using so-called L-filters which cut off all light below a certain wavelength. For example, when using a L445-filter then all the light below 445 nm is blocked from reaching the color laser marked article. Several properties were measured after the at least partial exposure of the laser marking method according to a preferred embodiment of the present invention as shown in Table 11.

TABLE 11

| Cut-off Filter | Dmin increase | % Inactivation of IR dye at: | | |
|---|---|---|---|---|
| | | 920 nm | 1064 nm | 1154 nm |
| L295 | Very strong | Moderate | Minimal | Minimal |
| L345 | Very strong | Moderate | Minimal | Minimal |
| L400 | Moderate | Strong | Moderate | Minimal |
| L445 | Moderate | Strong | Moderate | Minimal |
| L495 | Moderate | Strong | Minimal | Minimal |
| L550 | Minimal | Very strong | Moderate | Minimal |
| L610 | Minimal | Moderate | Moderate | Minimal |
| L695 | Minimal | Moderate | Moderate | Minimal |

Table 11 shows that color laser marked articles exposed using an L-filter of 550 nm or higher exhibited minimal $D_{min}$ increase, while the infrared dyes of at least two color laser markable layers were partially inactivated. The example using the L550 cut-off filter exhibited minimal $D_{min}$ increase, while the three color laser markable layers were inactivated to a different degree making a successful falsification extremely difficult, especially if this inactivation would be performed on some parts of the color laser marked article and not in others.

FIG. 1 shows the absorption spectrum from 700 to 1500 nm measured on the color laser marked article before exposure (solid line) and after an exposure though L495 cut-off filter (dotted line). One clearly observes a partial inactivation of infrared dyes IR-1 and IR-3.

Example 3

This example illustrates the importance of the order of the color laser markable layers in a color laser markable article, more particularly the importance of the order of the wavelengths of the infrared absorption maximum of the infrared dyes for color contamination.

Preparation of Color Laser Markable Articles LMA2 to LMA4

Color laser markable inner laminates IL1 and color laser markable outer laminates OL1 were prepared in the same manner as in Example 2.

An assembly was made of, in order, a white opaque core support CORE, the color laser markable inner laminate IL1, a 35 µm PETG TR foil, and the color laser markable outer laminate OL1, wherein the side coated with YCOL1 of the color laser markable inner laminate IL1 faces the white opaque core support CORE and wherein the side coated with MCOL1 of the color laser markable outer laminate OL1 faces the 35 µm PETG TR foil. The assembly was then laminated into a color laser markable article LMA5 using an Oasys™ OLA6/7 plate laminator with the settings: LPT=130° C., LP=40, Hold=210 sec, HPT=130° C., HP=40 and ECT=50° C.

An assembly was made of, in order, a white opaque core support CORE, the color laser markable inner laminate IL1, a 35 µm PETG TR foil, and the color laser markable outer laminate OL1, wherein the side coated with BCOL1 of the color laser markable inner laminate IL1 faces the white opaque core support CORE and wherein the side coated with MCOL1 of the color laser markable outer laminate OL1 faces the 35 µm PETG TR foil. The assembly was then laminated into a color laser markable article LMA6 using an Oasys™ OLA6/7 plate laminator with the settings: LPT=130° C., LP=40, Hold=210 sec, HPT=130° C., HP=40 and ECT=50° C.

An assembly was made of, in order, a white opaque core support CORE, the color laser markable laminate OL1, the color laser markable laminate IL1, a 35 µm PETG TR foil, wherein the side coated with MCOL1 of the color laser markable laminate OL1 faces the white opaque core support CORE and wherein the side coated with BCOL1 of the color laser markable laminate IL1 faces the 35 µm PETG TR foil. The assembly was then laminated into a color laser markable article LMA7 using an Oasys™ OLA6/7 plate laminator with the settings: LPT=130° C., LP=40, Hold=210 sec, HPT=130° C., HP=40 and ECT=50° C.

The absorption maximum wavelength order of the infrared dyes in the color laser markable articles LMA2 to LMA4 is illustrated by Table 12.

TABLE 12

| LMA2 | LMA3 | LMA4 |
|---|---|---|
| Outermost surface | Outermost surface | Outermost surface |
| $\lambda_{max}$ (IR-3) | $\lambda_{max}$ (IR-3) | $\lambda_{max}$ (IR-2) |
| $\lambda_{max}$ (IR-2) | $\lambda_{max}$ (IR-1) | $\lambda_{max}$ (IR-1) |
| $\lambda_{max}$ (IR-1) | $\lambda_{max}$ (IR-2) | $\lambda_{max}$ (IR-3) |
| Opaque core support | Opaque core support | Opaque core support |

Evaluation and Results

The color laser markable articles LMA2 to LMA4 were laser marked with the three infrared lasers emitting at 920 nm, 1064 nm and 1154 nm in the same way as in Example 2.

After laser exposure, the color of the different color wedges produced by the three infrared lasers was visually inspected. The results are shown in Table 13.

TABLE 13

| Laser emission wavelength | Expected color | LMA5 | LMA6 | LMA7 |
|---|---|---|---|---|
| 920 nm | Magenta | Magenta | Magenta | Purple |
| 1064 nm | Blue | Blue | Greenish Blue | Blue |
| 1154 nm | Yellow | Yellow | Yellow | Yellow |

From Table 13, it should be clear that only the color laser markable article LMA2 having the correct wavelength order in accordance with the invention was capable of producing colors without color contamination.

The color laser markable article LMA2 was also used for exposure by combinations of two or three lasers for producing a color wedge.

The maximum optical density $D_{max}$ of each color wedge was measured. In addition the $D_{max}$ was also measured using a green, red or blue filter. The results are shown in Table 14.

TABLE 14

| Laser exposure | | | Perceived Color at $D_{max}$ | Maximum Optical Density $D_{max}$ | | | |
|---|---|---|---|---|---|---|---|
| 920 nm | 1064 nm | 1154 nm | | No Filter | Green Filter | Red Filter | Blue Filter |
| Yes | No | No | Magenta | 1.19 | 2.38 | 0.53 | 0.74 |
| No | Yes | No | Blue | 1.08 | 1.01 | 1.11 | 0.70 |
| No | No | Yes | Yellow | 0.47 | 0.53 | 0.36 | 1.34 |
| Yes | Yes | No | Purple | 1.79 | 2.58 | 1.21 | 0.89 |
| Yes | No | Yes | Red | 1.21 | 2.47 | 0.52 | 1.54 |
| No | Yes | Yes | Green | 1.10 | 1.03 | 1.12 | 1.37 |
| Yes | Yes | Yes | Brown | 1.91 | 2.72 | 1.24 | 1.67 |

Table 14 shows that mixed colors can be made by using two or three of the infrared lasers. By modulation of the laser power, different shades of these mixed colors can be obtained.

A brown color was obtained with the laser power settings of 4.5 W for the 920 nm laser, 4.0 W for the 1064 nm laser, and 2.25 W for the 1154 nm laser.

By increasing the laser power settings to 5.0 W for the 920 nm laser, 7.0 W for the 1064 nm laser, and 6.0 W for the 1154 nm laser, the maximum optical density exhibited a brownish black color. However, for certain images a neutral black color is preferred. It was found that a neutral black color $D_{max}$ was obtained by using only a 1064 nm laser at a laser power of 7.8 W.

Example 4

This example illustrates that by selecting the right nucleus groups A and C and the chain groups B for the infrared dyes, that dyes with minimal absorption in the visual spectrum (high ratio IR/VIS) are obtained. This is important not only from an esthetical viewpoint for having minimum background discoloration, but also for making falsification more difficult.

If an inactivation by an at least partial exposure of the laser marking method according to a preferred embodiment of the present invention would be performed using infrared dyes having background discoloration, then the bleaching of infrared dyes according to a certain pattern would also result in visible pattern. This visible pattern would make falsification easier since it would be apparent where and how much infrared dye was bleached.

Evaluation and Results

Table 15 shows which comparative nucleus groups CNA-1 to CNA-7 and CNC-1 to CNC-7 bearing some similarity with the nucleus groups A and C of the newly developed infrared dye were used. Also combinations falling outside the scope of the invention were used to illustrate the advantages in the absorption properties of the infrared dyes of the invention.

TABLE 15

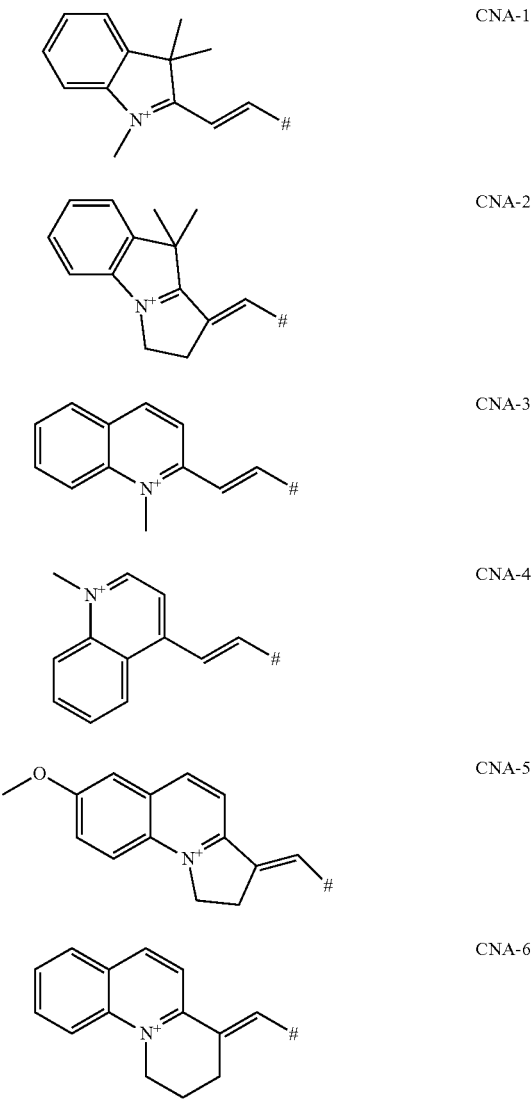

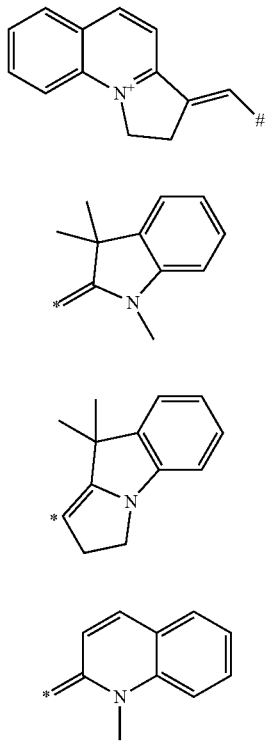

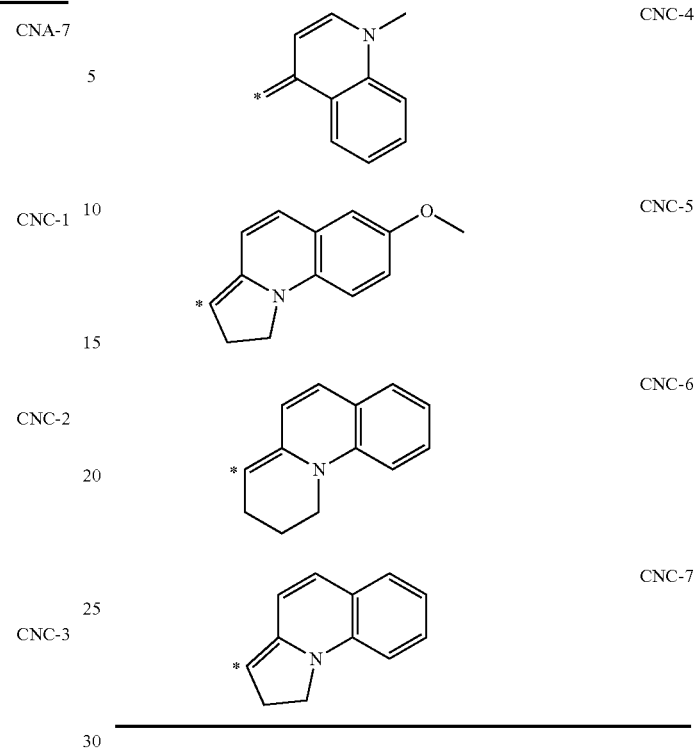

Table 16 shows the determined $\lambda_{max}$(IR) and the IR/VIS ratio for each infrared dye. The dyes all have chloride as one or more anions to compensate the charge of the dye cation.

TABLE 16

| Dye | | | | $\lambda_{max}$(IR) ≥ | | | | IR/VIS ≥ | |
|---|---|---|---|---|---|---|---|---|---|
| N° | NucA | ChB | NucC | 1100 nm | 1125 nm | 1140 nm | 1150 nm | 3.5 | 7.0 |
| 1 | CNA-1 | CB-1 | CNC-1 | No | No | No | No | Yes | Yes |
| 2 | CNA-1 | CB-3 | CNC-1 | Yes | Yes | No | No | No | No |
| 3 | CNA-1 | CB-5 | CNC-1 | No | No | No | No | Yes | Yes |
| 4 | CNA-1 | CB-6 | CNC-1 | No | No | No | No | Yes | Yes |
| 5 | CNA-1 | CB-7 | CNC-1 | No | No | No | No | Yes | Yes |
| 6 | CNA-1 | CB-10 | CNC-1 | No | No | No | No | Yes | Yes |
| 7 | CNA-1 | CB-11 | CNC-1 | No | No | No | No | Yes | Yes |
| 8 | CNA-1 | CB-12 | CNC-1 | No | No | No | No | Yes | Yes |
| 9 | CNA-1 | CB-14 | CNC-1 | No | No | No | No | Yes | Yes |
| 10 | CNA-1 | CB-18 | CNC-1 | No | No | No | No | No | No |
| 11 | CNA-2 | CB-1 | CNC-2 | No | No | No | No | Yes | Yes |
| 12 | CNA-2 | CB-3 | CNC-2 | Yes | Yes | Yes | Yes | No | No |
| 13 | CNA-2 | CB-26 | CNC-2 | Yes | Yes | Yes | No | No | No |
| 14 | CNA-3 | CB-19 | CNC-3 | No | No | No | No | Yes | Yes |
| 15 | CNA-4 | CB-19 | CNC-4 | No | No | No | No | Yes | Yes |
| 16 | CNA-4 | CB-23 | CNC-4 | No | No | No | No | Yes | Yes |
| 17 | CNA-5 | CB-19 | CNC-5 | No | No | No | No | Yes | Yes |
| 18 | CNA-6 | CB-19 | CNC-6 | No | No | No | No | Yes | Yes |
| 19 | CNA-7 | CB-19 | CNC-7 | No | No | No | No | Yes | Yes |
| 20 | NA-1 | CB-19 | NC-1 | No | No | No | No | Yes | Yes |
| 21 | NA-2 | CB-19 | NC-2 | No | No | No | No | Yes | Yes |
| 22 | NA-2 | CB-25 | NC-2 | No | No | No | No | Yes | Yes |
| 23 | NA-1 | CB-1 | NC-1 | Yes | Yes | Yes | Yes | Yes | No |
| 24 | NA-1 | CB-2 | NC-1 | Yes | Yes | Yes | Yes | Yes | No |
| 25 | NA-1 | CB-4 | NC-1 | Yes | No | No | No | Yes | Yes |
| 26 | NA-1 | CB-5 | NC-1 | Yes | Yes | Yes | No | Yes | Yes |
| 27 | NA-1 | CB-6 | NC-1 | Yes | Yes | Yes | Yes | Yes | Yes |
| 28 | NA-1 | CB-7 | NC-1 | Yes | Yes | No | No | Yes | Yes |
| 29 | NA-1 | CB-8 | NC-1 | Yes | Yes | Yes | Yes | Yes | No |
| 30 | NA-1 | CB-9 | NC-1 | Yes | Yes | No | No | Yes | No |
| 31 | NA-1 | CB-10 | NC-1 | Yes | Yes | No | No | Yes | No |
| 32 | NA-1 | CB-11 | NC-1 | Yes | Yes | Yes | Yes | Yes | Yes |
| 33 | NA-1 | CB-12 | NC-1 | Yes | Yes | Yes | Yes | Yes | Yes |
| 34 | NA-1 | CB-13 | NC-1 | Yes | Yes | Yes | Yes | Yes | Yes |

TABLE 16-continued

| Dye N° | NucA | ChB | NucC | λmax(IR) ≥ 1100 nm | 1125 nm | 1140 nm | 1150 nm | IR/VIS ≥ 3.5 | 7.0 |
|---|---|---|---|---|---|---|---|---|---|
| 35 | NA-1 | CB-14 | NC-1 | Yes | Yes | Yes | Yes | Yes | No |
| 36 | NA-1 | CB-15 | NC-1 | Yes | Yes | Yes | Yes | Yes | No |
| 37 | NA-1 | CB-16 | NC-1 | Yes | Yes | Yes | Yes | Yes | Yes |
| 38 | NA-1 | CB-17 | NC-1 | Yes | Yes | Yes | Yes | Yes | Yes |
| 39 | NA-1 | CB-17 | NC-1 | Yes | Yes | Yes | Yes | Yes | Yes |
| 40 | NA-1 | CB-18 | NC-1 | Yes | Yes | Yes | Yes | Yes | Yes |
| 41 | NA-3 | CB-19 | NC-3 | Yes | No | No | No | Yes | Yes |
| 42 | NA-4 | CB-19 | NC-4 | Yes | No | No | No | Yes | Yes |
| 43 | NA-5 | CB-19 | NC-5 | Yes | Yes | No | No | Yes | Yes |
| 44 | NA-5 | CB-19 | NC-5 | Yes | No | No | No | Yes | Yes |
| 45 | NA-5 | CB-23 | NC-5 | Yes | Yes | No | No | Yes | Yes |
| 46 | NA-6 | CB-19 | NC-6 | Yes | Yes | Yes | Yes | Yes | Yes |
| 47 | NA-7 | CB-19 | NC-7 | Yes | Yes | Yes | Yes | Yes | Yes |
| 48 | NA-8 | CB-19 | NC-8 | Yes | Yes | Yes | Yes | Yes | Yes |
| 49 | NA-9 | CB-19 | NC-9 | Yes | Yes | Yes | Yes | Yes | Yes |
| 50 | NA-12 | CB-19 | NC-12 | Yes | No | No | No | Yes | Yes |
| 51 | NA-13 | CB-19 | NC-13 | Yes | Yes | No | No | Yes | Yes |
| 52 | NA-15 | CB-19 | NC-15 | Yes | No | No | No | Yes | Yes |
| 53 | NA-16 | CB-19 | NC-16 | Yes | No | No | No | Yes | Yes |
| 54 | NA-17 | CB-19 | NC-17 | Yes | Yes | Yes | Yes | Yes | Yes |
| 55 | NA-18 | CB-19 | NC-18 | Yes | Yes | No | No | Yes | Yes |
| 56 | NA-19 | CB-19 | NC-19 | Yes | Yes | Yes | No | Yes | Yes |
| 57 | NA-20 | CB-19 | NC-20 | Yes | Yes | Yes | No | Yes | Yes |
| 58 | NA-20 | CB-25 | NC-20 | Yes | Yes | Yes | No | Yes | Yes |
| 59 | NA-21 | CB-19 | NC-21 | Yes | Yes | Yes | Yes | Yes | Yes |
| 60 | NA-22 | CB-19 | NC-22 | Yes | Yes | No | No | Yes | Yes |
| 61 | NA-22 | CB-23 | NC-22 | Yes | Yes | No | No | Yes | Yes |
| 62 | NA-22 | CB-24 | NC-22 | Yes | Yes | No | No | Yes | Yes |
| 63 | NA-24 | CB-11 | NC-24 | Yes | Yes | No | No | Yes | Yes |
| 64 | NA-24 | CB-3 | NC-24 | Yes | Yes | Yes | Yes | Yes | No |

From Table 16, it should be clear that the combination of the nucleus groups A and C and the chain groups B of the newly developed infrared dyes have an absorption maximum above 1100 nm, while maintaining low background discoloration (high IR/VIS ratio).

The invention claimed is:

1. A method for preparing a color laser marked article using three infrared lasers L-1, L-2, and L-3 having respectively a laser emission wavelength of λ(L-1), λ(L-2), and λ(L-3), the method comprising the steps of:
   laser marking with the infrared laser L-1 a first color laser markable layer including an infrared dye IR-1 having an absorption maximum $\lambda_{max}$(IR-1) in the infrared region and a leuco dye capable of forming a first color;
   laser marking with the infrared laser L-2 a second color laser markable layer including an infrared dye IR-2 having an absorption maximum $\lambda_{max}$(IR-2) in the infrared region and a leuco dye capable of forming a second color;
   laser marking with the infrared laser L-3 a third color laser markable layer including an infrared dye IR-3 having an absorption maximum $\lambda_{max}$(IR-3) in the infrared region and a leuco dye capable of forming a third color; and
   using a laser or an LED to at least partially expose the color laser marked article to light having a wavelength between 520 nm and 700 nm to at least partially inactivate the infrared dye IR-1, the infrared dye IR-2, and/or the infrared dye IR-3; wherein
   the laser emission wavelengths satisfy the condition of:

λ(L-1)>λ(L-2)>λ(L-3);

the infrared red dye absorption maxima satisfy the condition of:

$\lambda_{max}$(IR-1)>$\lambda_{max}$(IR-2)>$\lambda_{max}$(IR-3);

light emitted by the infrared laser L-1 passes, in order, through the third color laser markable layer and the second color laser markable layer before exposing the first color laser markable layer; and
   the infrared dye IR-1, the infrared dye IR-2, and the infrared dye IR-3 are cyanine dyes having anions selected from Cl, Br, I, fluoroalkyl sulfonates, arylsulfonates and alkylsulfonates.

2. The method according to claim 1, wherein the light in the step of at least partially exposing the color laser marked article to light has a wavelength between 550 nm and 600 nm.

3. The method according to claim 1, wherein 800 nm<$\lambda_{max}$(IR-3)<1000 nm.

4. The method according to claim 3, wherein $\lambda_{max}$(IR-1)>1100 nm.

5. The method according to claim 4, wherein the laser emission wavelengths λ(L-1), λ(L-2), and λ(L-3) differ by no more than 30 nm from the infrared red dye absorption maxima $\lambda_{max}$(IR-1), $\lambda_{max}$(IR-2), and $\lambda_{max}$(IR-3), respectively.

6. The method according to claim 1, wherein $\lambda_{max}$(IR-1)>1100 nm.

7. The method according to claim 1, wherein the laser emission wavelengths λ(L-1), λ(L-2), and λ(L-3) differ by no more than 30 nm from the infrared red dye absorption maxima $\lambda_{max}$(IR-1), $\lambda_{max}$(IR-2), and $\lambda_{max}$(IR-3), respectively.

8. The method according to claim 1, wherein the step of at least partially exposing the color laser marked article to light having the wavelength between 520 nm and 700 nm is performed according to an image.

9. The method according to claim 1, wherein the step of at least partially exposing the color laser marked article to light having the wavelength between 520 nm and 700 nm is an overall exposure.

10. The method according to claim 1, wherein the color laser marked article is laser marked through a transparent biaxially stretched polyethylene terephthalate foil.

11. The method according to claim 1, wherein the step of at least partially exposing the color laser marked article to light having the wavelength between 520 nm and 700 nm is performed after the steps of laser marking the first color laser markable layer, laser marking the second color laser markable layer, and laser marking the third color laser markable layer.

12. The method according to claim 1, wherein the step of at least partially exposing the color laser marked article to light having the wavelength between 520 nm and 700 nm is performed before the step of laser marking the first color laser markable layer, but after the steps of laser marking the second color laser markable layer and laser marking the third color laser markable layer.

13. A method of forming a color laser marked article comprising the steps of:
 providing a color laser marked article including, in order, at least:
  a) a core support;
  b) a first color laser markable layer including an infrared dye IR-1 having an absorption maximum $\lambda_{max}$(IR-1) in the infrared region and a leuco dye capable of forming a first color;
  c) a second color laser markable layer including an infrared dye IR-2 having an absorption maximum $\lambda_{max}$(IR-2) in the infrared region and a leuco dye capable of forming a second color; and
  d) a third color laser markable layer including an infrared dye IR-3 having an absorption maximum $\lambda_{max}$(IR-3) in the infrared region and a leuco dye capable of forming a third color; and
 using a laser or an LED to apply light having a wavelength between 520 nm and 700 nm to the color laser marked article to impede modification by color laser marking of the color laser marked article; wherein
 the infrared dye absorption maxima satisfy the condition of:

$$\lambda_{max}(IR\text{-}1) > \lambda_{max}(IR\text{-}2) > \lambda_{max}(IR\text{-}3); \text{ and}$$

the infrared dye IR-1, the infrared dye IR-2, and the infrared dye IR-3 are cyanine dyes having anions selected from Cl, Br, I, fluoroalkyl, sulfonates, arylsulfonates and alkylsulfonates.

* * * * *